(12) United States Patent
Hu et al.

(10) Patent No.: US 12,199,904 B2
(45) Date of Patent: Jan. 14, 2025

(54) SIGNAL SENDING METHOD, SIGNAL RECEIVING METHOD, AND APPARATUS

(71) Applicant: Huawei Technologies Co., Ltd., Shenzhen (CN)

(72) Inventors: Yuanzhou Hu, Shanghai (CN); Fan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 358 days.

(21) Appl. No.: 17/733,798

(22) Filed: Apr. 29, 2022

(65) Prior Publication Data

US 2022/0329379 A1 Oct. 13, 2022

Related U.S. Application Data

(63) Continuation of application No. PCT/CN2019/114758, filed on Oct. 31, 2019.

(51) Int. Cl.
*H04L 5/00* (2006.01)

(52) U.S. Cl.
CPC .......... *H04L 5/0048* (2013.01); *H04L 5/0005* (2013.01)

(58) Field of Classification Search
CPC ... H04L 5/0048; H04L 5/0055; H04L 5/0094; H04L 27/2636; H04L 27/2657
See application file for complete search history.

(56) References Cited

U.S. PATENT DOCUMENTS

2018/0279324 A1* 9/2018 Wang .................. H04L 5/0055
2019/0356526 A1* 11/2019 Kuchi ................. H04L 27/2636
(Continued)

FOREIGN PATENT DOCUMENTS

CN 103888406 A 6/2014
CN 106165360 A 11/2016
(Continued)

OTHER PUBLICATIONS

Shi et al., "The Pilot Design for OFDM-OQAM in Time-varying Channels," 2017 International Conference on Wireless Communications, Signal Processing and Networking (WISPNET), pp. 1572-1577, XP033324275, Institute of Electrical and Electronics Engineers, New York, New York (Mar. 2017).

(Continued)

*Primary Examiner* — Michael Thier
*Assistant Examiner* — Prince A Mensah
(74) *Attorney, Agent, or Firm* — Leydig, Voit & Mayer, Ltd.

(57) ABSTRACT

A signal sending method and apparatus, to improve channel estimation performance are provided. A reference signal is sent on one or more consecutive symbols, and modulation data is sent on an adjacent symbol previous to the one or more consecutive symbols in time domain and an adjacent symbol next to the one or more consecutive symbols in time domain. A sum of the modulation data carried in the symbol previous to the one or more consecutive symbols and the modulation data carried in the symbol next to the one or more consecutive symbols is zero or the modulation data is the same. According to the application, after time-domain filtering, the reference signal is not interfered with by the adjacent modulation data, so that channel estimation performance can be ensured.

20 Claims, 17 Drawing Sheets

(56) References Cited

U.S. PATENT DOCUMENTS

2020/0037346 A1* 1/2020 Takeda .................. H04L 5/0094
2021/0099329 A1* 4/2021 Hellfajer ............. H04L 27/2657

FOREIGN PATENT DOCUMENTS

| CN | 110213191 A | 9/2019 |
|---|---|---|
| CN | 110971555 A | 4/2020 |
| WO | 2008007019 A2 | 1/2008 |
| WO | 2011054368 A1 | 5/2011 |

OTHER PUBLICATIONS

Cui et al., "Coded Auxiliary Pilots for Channel Estimation in FBMC-OQAM Systems," IEEE Transactions on Vehicular Technology, vol. 65, No. 5, pp. 2936-2946, XP011610035, Institute of Electrical and Electronics Engineers, New York, New York (May 2016).

* cited by examiner

SIGNAL SENDING METHOD, SIGNAL RECEIVING METHOD, AND APPARATUS

CROSS-REFERENCE TO RELATED APPLICATIONS

This application is a continuation of International Application No. PCT/CN2019/114758, filed on Oct. 31, 2019, the disclosure of which is hereby incorporated by reference in its entirety.

TECHNICAL FIELD

Embodiments of this application relate to the field of communication technologies, and in particular, to a signal sending method, a signal receiving method, and an apparatus.

BACKGROUND

An internet of things (IoT) scenario requires that a device have features such as wide coverage, a long battery lifespan, and a relatively low price, so that asynchronous transmission may be used for transmission between devices. To reduce out-of-band leakage generated during asynchronous transmission, a time-domain filtering manner may be used for a time-domain signal. A polyphase network may be used for time-domain filtering, and a length of a filter exceeds one symbol.

Generally, in a complete data transmission process, in addition to data, a reference signal also needs to be sent. The reference signal is used for channel estimation, and an obtained channel response may be used to assist in demodulation of received data. When duration of a time-domain filter exceeds duration of one symbol, filtering data that is of one symbol and that is obtained by implementing time-domain filtering by using the polyphase network is obtained by mixing time-domain signals of several symbols. In this case, a symbol in which the reference signal is located is interfered with by several adjacent symbols, and channel estimation performance is affected, thereby affecting demodulation performance.

SUMMARY

Embodiments of this application provide a signal sending method, a signal receiving method, and an apparatus, to resolve a problem that channel estimation performance is affected.

According to a first aspect, an embodiment of this application provides a signal sending method. The method may be performed by a terminal device, or may be performed by a component (for example, a processor, a chip, or a chip system) of the terminal device, or may be performed by a network device, or may be performed by a component (for example, a processor, a chip, or a chip system) of the network device. The following is described by using an example in which an execution body is the terminal device. The terminal device sends a reference signal to the network device on a first symbol, sends first modulation data to the network device on a second symbol, and sends second modulation data to the network device on a third symbol, where the second symbol and the third symbol are separately adjacent to the first symbol, and the second symbol is different from the third symbol. A sum of the first modulation data and the second modulation data is 0, or the first modulation data and the second modulation data are the same.

In the foregoing manner, a sum of the adjacent modulation data previous to and next to the symbol of the reference signal in time domain is 0 (in other words, is reverse to each other) or the adjacent modulation data is the same, so that after time-domain filtering, the reference signal is not interfered with by the adjacent modulation data, and channel estimation performance is ensured.

In a possible implementation, the reference signal on the first symbol is used to demodulate the first modulation data and the second modulation data. A channel is estimated by using the reference signal, so that the first modulation data and the second modulation data are demodulated to obtain data that is more accurate.

In a possible implementation, the reference signal sent on the first symbol, the first modulation data, and the second modulation data may be obtained through processing by using a binary phase shift keying BPSK modulation scheme or a Pi/2-BPSK modulation scheme. The reference signal on the first symbol, the first modulation data, and the second modulation data are sent after filtering processing is performed. For example, the reference signal and the modulation data may be sent after frequency domain resource mapping, inverse Fourier transform, and time-domain filtering processing are performed.

In a possible implementation, at least two reference signals may be sent in one slot, so that data demodulation performance of the terminal device in a high-speed movement scenario can be ensured. The at least two reference signals may be consecutive in time domain, or may be inconsecutive in the time domain.

In a possible implementation, when the sum of the first modulation data and the second modulation data is 0, two consecutive first symbols in time domain are used to carry reference signals, and a sum of the reference signals respectively carried on the two consecutive first symbols in time domain is 0. Two reference signals are consecutively sent, so that performance of the terminal device in a high-speed movement scenario can be ensured; and a sum of the two reference signals is zero, to ensure that the reference signals do not interfere with each other.

In a possible implementation, when the first modulation data and the second modulation data are the same, two consecutive first symbols in time domain are used to carry reference signals, and the reference signals respectively carried on the two consecutive first symbols in time domain are the same. Two reference signals are consecutively sent, so that performance of the terminal device in a high-speed movement scenario can be ensured. In addition, the two reference signals are the same, and adjacent modulation data previous to and next to symbols of the reference signals in time domain is also the same. This ensures that the reference signals do not interfere with each other, and reduces interference caused by the modulation data to the reference signals.

In a possible implementation, the sum of the first modulation data and the second modulation data is 0, and the method further includes: sending third modulation data on a fourth symbol, and sending fourth modulation data on a fifth symbol, where the fourth symbol is adjacent to the second symbol in time domain, the fifth symbol is adjacent to the third symbol in time domain, and a sum of the third modulation data and the fourth modulation data is 0. In the foregoing design, the plurality of pieces of adjacent modulation data previous to and next to the symbols of the reference signals in time domain are reverse to each other, so that after time-domain filtering, the reference signals are prevented from being interfered with by the plurality of pieces of adjacent modulation data, and the channel estimation performance is further ensured.

In a possible implementation, the first modulation data is the same as the second modulation data, and the method further includes: sending third modulation data on a fourth symbol, and sending fourth modulation data on a fifth symbol, where the fourth symbol is adjacent to the second symbol in time domain, the fifth symbol is adjacent to the third symbol in time domain, and the third modulation data and the fourth modulation data are the same. In the foregoing design, the plurality of pieces of modulation data previous to and next to the symbols of the reference signals in time domain are the same, so that after time-domain filtering, the reference signals are prevented from being interfered with by the plurality of pieces of adjacent modulation data, and the channel estimation performance is further ensured.

In a possible implementation, the first symbol, the second symbol, and the third symbol are included in a resource unit RU, a quantity of symbols included in the RU is related to a quantity of repetitions of data on the RU, and the data on the RU includes the first modulation data and the second modulation data.

Optionally, a quantity of times of sending the data on the RU is K, and the quantity of symbols included in the RU is $N_{symb}^{RU}=f(K) \times M$. For example, when the quantity of times of sending the data on the RU is 1, that is, K=1, a quantity of symbols included in one RU is $N_{symb}^{RU}=M$. For another example, when the configured quantity of times of sending the data on the RU is greater than 1 and is an even number, that is, K>1, and K is an even number, a quantity of symbols included in one RU is $N_{symb}^{RU}=2 \times M$.

In a case, when both a quantity of sending times that is configured when the method for sending a reference signal and modulation data provided in this embodiment of this application is used and a quantity of sending times that is configured when the method provided in this embodiment of this application is not used are K, when the solution provided in this embodiment of this application is not used, the quantity of the symbols in one RU always remains unchanged when the quantity of sending times changes. When the method provided in this embodiment of this application is used, for example, the configured quantity of sending times is K=1, the quantity of the symbols included in one RU is $N_{symb}^{RU}=M$. During actual sending, data on the RU is sent once. For another example, if the configured quantity of sending times is K>1, and K is an even number, during actual sending, to improve demodulation performance, the quantity of the symbols included in one RU is $N_{symb}^{RU}=f(K) \times M$, and a quantity of times of sending data on the RU is K/f(K). For example, K>1, and K is an even number, f(K)=2, and an actual quantity of times of sending the data on the RU is K/2.

In another case, different configuration solutions may be used for the quantity of sending times that is configured when the method for sending a reference signal and modulation data provided in this embodiment of this application is used and the quantity of sending times that is configured when the method provided in this embodiment of this application is not used. For example, when the solution provided in this embodiment of this application is not used, a configured quantity of sending times is K, the quantity of the symbols on one RU is $N_{symb}^{RU}=M$, and an actual quantity of sending times is K. When the solution provided in this embodiment of this application is used, the configured quantity of sending times is K', and the quantity of the symbols included in one RU is $N_{symb}^{RU}=f(K') \times M$. For example, when K'=1, f(K')=1. For another example, when K'>1, f(K')=2.

According to a second aspect, an embodiment of this application provides a signal receiving method. The method may be performed by a terminal device, or may be performed by a component (for example, a processor, a chip, or a chip system) of the terminal device, or may be performed by a network device, or may be performed by a component (for example, a processor, a chip, or a chip system) of the network device. The following is described by using an example in which an execution body is the network device. The network device receives a reference signal on a first symbol, receives first modulation data on a second symbol, and receives second modulation data on a third symbol, where the second symbol and the third symbol are separately adjacent to the first symbol, the second symbol is different from the third symbol, and a sum of the first modulation data and the second modulation data is 0, or the first modulation data and the second modulation data are the same. In the foregoing manner, a sum of the adjacent modulation data previous to and next to the symbol of the reference signal in time domain is 0 (in other words, is reverse to each other) or the adjacent modulation data is the same, so that after time-domain filtering, the reference signal is not interfered with by the adjacent modulation data, and channel estimation performance is ensured.

In a possible implementation, the reference signal on the first symbol is used to demodulate the first modulation data and the second modulation data.

In a possible implementation, the reference signal, the first modulation data sent on the first symbol, and the second modulation data may be obtained through processing by using a binary phase shift keying BPSK modulation scheme or a Pi/2-BPSK modulation scheme. The reference signal on the first symbol, the first modulation data, and the second modulation data are obtained after filtering processing is performed. For example, to receive the reference signal and the modulation data, frequency domain resource mapping, inverse Fourier transform, and time-domain filtering processing may be performed on received data (including the modulation data and the reference signal) to obtain the reference signal and the modulation data.

In a possible implementation, when the sum of the first modulation data and the second modulation data is 0, two consecutive first symbols in time domain are used to carry reference signals, and a sum of the reference signals respectively carried on the two consecutive first symbols in time domain is 0.

In a possible implementation, when the first modulation data and the second modulation data are the same, two consecutive first symbols in time domain are used to carry reference signals, and the reference signals respectively carried on the two consecutive first symbols in time domain are the same.

In a possible implementation, the sum of the first modulation data and the second modulation data is 0, and the method further includes: The network device receives third modulation data on a fourth symbol, and receives fourth modulation data on a fifth symbol, where the fourth symbol is adjacent to the second symbol in time domain, the fifth symbol is adjacent to the third symbol in time domain, and a sum of the third modulation data and the fourth modulation data is 0.

In a possible implementation, the first modulation data and the second modulation data are the same, and the method further includes: The network device receives third modulation data on a fourth symbol, and receives fourth modulation data on a fifth symbol, where the fourth symbol is adjacent to the second symbol in time domain, and the third modulation data and the fourth modulation data are the same.

In a possible implementation, the first symbol, the second symbol, and the third symbol are included in a resource unit RU, a quantity of symbols included in the RU is related to a quantity of repetitions of data on the RU, and the data on the RU includes the first modulation data and the second modulation data.

In a possible implementation, the network device demodulates the first modulation data and the second modulation data based on the reference signal on the first symbol.

For descriptions of beneficial effects of the second aspect, refer to the descriptions of the first aspect. Details are not described herein again.

According to a third aspect, an embodiment of this application provides an apparatus, to implement the method in any one of the first aspect or the possible implementations of the first aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a fourth aspect, an embodiment of this application provides an apparatus, to implement the method in any one of the second aspect or the possible implementations of the second aspect. The apparatus includes a corresponding unit or component configured to perform the foregoing method. The unit included in the apparatus may be implemented by using software and/or hardware. The apparatus may be, for example, a terminal, or a chip, a chip system, or a processor that can support the terminal in implementing the foregoing method.

According to a fifth aspect, an embodiment of this application provides an apparatus, including a processor, where the processor is coupled to a memory, the memory is configured to store a program or instructions, and when the program or the instructions are executed by the processor, the apparatus is enabled to implement the method in any one of the first aspect or the possible implementations of the first aspect.

According to a sixth aspect, an embodiment of this application provides an apparatus, including a processor, where the processor is coupled to a memory, the memory is configured to store a program or instructions, and when the program or the instructions are executed by the processor, the apparatus is enabled to implement the method in any one of the second aspect or the possible implementations of the second aspect.

According to a seventh aspect, an embodiment of this application provides a computer-readable medium. The computer-readable medium stores a computer program or instructions, and when the computer program or instructions are executed, a computer is enabled to perform the method in any one of the first aspect or the possible implementations of the first aspect.

According to an eighth aspect, an embodiment of this application provides a computer-readable medium. The computer-readable medium stores a computer program or instructions, and when the computer program or instructions are executed, a computer is enabled to perform the method in any one of the second aspect or the possible implementations of the second aspect.

According to a ninth aspect, an embodiment of this application provides a computer program product. The computer program product includes computer program code. When the computer program code is run on a computer, the computer is enabled to perform the method in any one of the first aspect or the possible implementations of the first aspect.

According to a tenth aspect, an embodiment of this application provides a computer program product. The computer program product includes computer program code. When the computer program code is run on a computer, the computer is enabled to perform the method in any one of the second aspect or the possible implementations of the second aspect.

According to an eleventh aspect, an embodiment of this application provides a chip, including a processor, where the processor is coupled to a memory, the memory is configured to store a program or instructions, and when the program or the instructions are executed by the processor, the chip is enabled to implement the method in any one of the first aspect or the possible implementations of the first aspect.

According to a twelfth aspect, an embodiment of this application provides a chip, including a processor, where the processor is coupled to a memory, the memory is configured to store a program or instructions, and when the program or the instructions are executed by the processor, the chip is enabled to implement the method in any one of the second aspect or the possible implementations of the second aspect.

According to a thirteenth aspect, an embodiment of this application provides a communication system, including the apparatus according to the third aspect and/or the apparatus according to the fourth aspect.

According to a fourteenth aspect, an embodiment of this application provides a communication system, including the apparatus according to the fifth aspect and/or the apparatus according to the sixth aspect.

DESCRIPTION OF EMBODIMENTS

Figure 1:
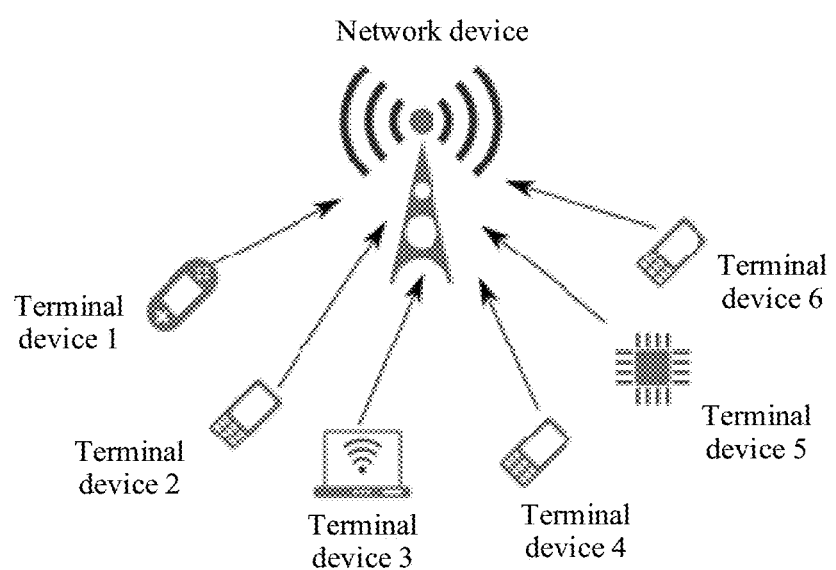
FIG. 1 is a schematic diagram of an architecture of a communication system according to an embodiment of this application.

FIG. 1 is a schematic diagram of an architecture of a communication system according to an embodiment of this application. As shown in FIG. 1, the communication system includes a network device and a terminal device (for example, a terminal device 1 to a terminal device 6 in FIG. 1). The terminal device is connected to the network device in a wireless manner. The terminal device may be located at a fixed location, or may be mobile. In addition, it should be noted that FIG. 1 is merely a schematic diagram. The communication system may further include another network device, for example, may further include one or more of a core network device, a wireless relay device, and a wireless backhaul device that are not shown in FIG. 1. Quantities of network devices and terminal devices included in the communication system are not limited in embodiments of this application.

Technologies described in embodiments of this application may be applied to various communication systems, for example, a 4th generation (4G) communication system, a 4.5G communication system, a 5G communication system, a system integrating a plurality of communication systems, and a future evolved communication system. For example, the communication systems may be a long term evolution (LTE) system, a new radio (NR) system, a wireless-fidelity (WiFi) system, a communication system related to the 3rd generation partnership project (3GPP), and another communication system of this type.

In this application, the network device may be any device having a wireless transceiver function. The network device includes but is not limited to: an evolved NodeB (NodeB or eNB or e-NodeB, evolutional NodeB) in LTE, a base station (gNodeB or gNB) or a transmission reception point (or transmission receiving point, TRP) in NR, a base station that subsequently evolves in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations may support networks of a same technology mentioned above, or may support networks of different technologies mentioned above. The base station may include one or more co-site or non-co-site TRPs. The network device may alternatively be a radio controller, a centralized unit (CU), and/or a distributed unit (DU) in a cloud radio access network (CRAN) scenario. The network device may alternatively be a server, a wearable device, a machine communication device, a vehicle-mounted device, or the like. An example in which the network device is a base station is used for description below. The plurality of network devices may be base stations of a same type or base stations of different types. The base station may communicate with a terminal device, or may communicate with the terminal device through a relay station. The terminal device may communicate with a plurality of base stations using different technologies. For example, the terminal device may communicate with a base station supporting an LTE network, may communicate with a base station supporting a 5G network, and may further support dual connections to a base station in the LTE network and a base station in the 5G network.

The terminal device is a device having a wireless transceiver function, and may be deployed on land, including an indoor device, an outdoor device, a handheld device, a wearable device, or a vehicle-mounted device; may be deployed on a water surface (for example, on a ship); or may be deployed in the air (for example, on a plane, a balloon, and a satellite). The terminal device may be a mobile phone, a tablet computer (Pad), a computer with a wireless transceiver function, a virtual reality (VR) terminal device, an augmented reality (AR) terminal device, a terminal device in industrial control, a vehicle-mounted terminal device, a terminal device in unmanned driving (self driving), a terminal device in assisted driving, a terminal device in telemedicine (remote medical), or a terminal device in a smart grid, a terminal device in transportation safety, a terminal device in a smart city, a terminal device in a smart home, and the like. Application scenarios are not limited in embodiments of this application. The terminal device may also be sometimes referred to as a terminal, user equipment (UE), an access terminal device, a vehicle-mounted terminal, an industrial control terminal, a UE unit, a UE station, a mobile station, a mobile console, a remote station, a remote terminal device, a mobile device, a UE terminal device, a wireless communication device, a machine terminal, a UE agent, a UE apparatus, or the like. The terminal device may be fixed or mobile.

The network device and the terminal device may be deployed on the land, including an indoor device, an outdoor device, a handheld device, or a vehicle-mounted device; may be deployed on the water surface; or may be deployed on a plane, a balloon, and a satellite in the air. Application scenarios of the network device and the terminal device are not limited in embodiments of this application.

The network device and the terminal device may communicate with each other by using a licensed spectrum, or may communicate with each other by using an unlicensed spectrum, or may communicate with each other by using both the licensed spectrum and the unlicensed spectrum. The network device and the terminal device may communicate with each other by using a spectrum below 6 gigahertz (GHz), or may communicate with each other by using a spectrum above 6 GHz, or may communicate with each other by using both the spectrum below 6 GHz and the spectrum above 6 GHz. A spectrum resource used between the network device and the terminal device is not limited in embodiments of this application.

By way of example and not limitation, in this application, the terminal device may be a wearable device. The wearable device may also be referred to as a wearable intelligent device, and is a general term of wearable devices, such as glasses, gloves, watches, clothes, and shoes, that are developed by applying wearable technologies to intelligent designs of daily wear. The wearable device is a portable device that can be directly worn by a user or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, for example, smartwatches or smart glasses, and devices that focus on only one type of application function and need to work with other devices such as smartphones, for example, various smart bands or smart jewelry for monitoring physical signs.

In this application, the terminal device may alternatively be a terminal device in an internet of things (IoT) system. The IoT is an important component in development of future information technologies. A main technical feature of the IoT is to connect an object to a network by using a communication technology, to implement an intelligent network of human-machine interconnection and thing-thing interconnection. The terminal device in this application may be a terminal device in machine type communication (MTC). The terminal device in this application may alternatively be a vehicle-mounted module, a vehicle-mounted module assembly, a vehicle-mounted component, a vehicle-mounted chip, or a vehicle-mounted unit that is equipped with a vehicle as one or more components or units. The vehicle uses the vehicle-mounted module, the vehicle-mounted module assembly, the vehicle-mounted component, the vehicle-mounted chip, or the vehicle-mounted unit that is equipped with the vehicle, to implement a method in this application. Therefore, embodiments of this application may be applied to an internet of vehicles, for example, vehicle to everything (V2X), long term evolution vehicle (LTE-V), or vehicle to vehicle (V2V).

It should be understood that a system architecture described in embodiments of this application is intended to describe the technical solutions in embodiments of this application more clearly, and does not constitute a limitation on the technical solutions provided in embodiments of this application. A person of ordinary skill in the art may understand that, with evolution of a network architecture and emergence of a new service scenario, the technical solutions provided in embodiments of this application are also applicable to a similar technical problem.

The following describes technical terms in embodiments of this application.

1) Slot and Symbol

In this application, unless otherwise specified, a symbol is a time-domain symbol. The time-domain symbol herein may be an orthogonal frequency division multiplexing (OFDM) symbol, or may be a discrete Fourier transform-spread-OFDM (DFT-s-OFDM) symbol. When the symbol uses a normal cyclic prefix (NCP), one slot may include 14 symbols. When the symbol uses an extended cyclic prefix (ECP), one slot may include 12 symbols. In embodiments of this application, an example in which one slot includes 14 symbols is used. Certainly, in a future communication system, one slot may further include another quantity of symbols. For example, one slot includes 16 symbols. This is not limited in this application.

2) Single Tone Waveform

In a single tone waveform, one piece of modulation data is mapped to one subcarrier, and then inverse Fourier transform is performed to generate a time-domain signal of a symbol. The modulation data may be obtained by performing Pi/2 phase rotation on binary phase shift keying (BPSK) modulation data, where a phase factor of the Pi/2 phase rotation is determined by an index l of a symbol. For example, the phase factor is $e^{j \times \pi \times (l \bmod 2)}/2$. The BPSK modulation data is obtained by performing BPSK modulation on a to-be-sent bit.

Figure 2:
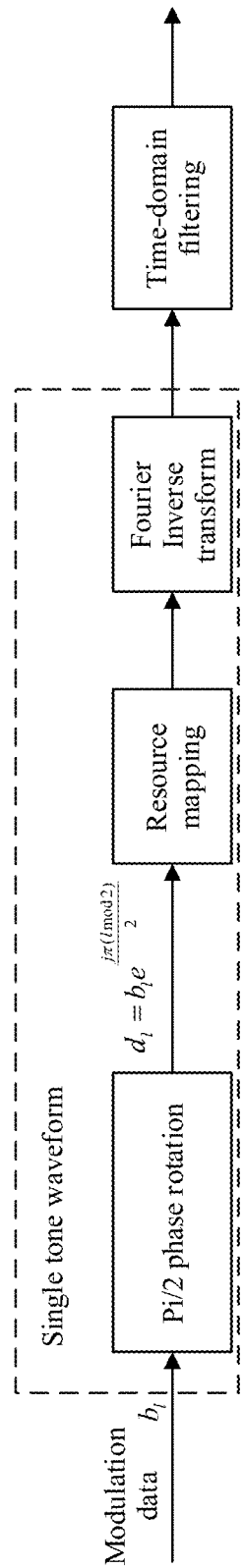
FIG. 2 is a schematic diagram of data processing of a single tone (Single tone) waveform according to an embodiment of this application.

To reduce out-of-band leakage (out of band emission, OOB emission) of the single tone waveform, a time-domain filter may be used to perform time-domain filtering on a time-domain signal on a symbol, for example, as shown in FIG. 2. For example, the time-domain filtering may be implemented by using common linear convolution. In this case, duration of the time-domain filter is generally less than duration of one symbol. Alternatively, the time-domain filtering may be implemented by using a polyphase network (PPN). In this case, duration of the time-domain filter exceeds duration of one symbol.

It should be understood that, when the duration of the time-domain filter exceeds the duration of one symbol, filtering data that is of one symbol and that is obtained by performing time-domain filtering by using the polyphase network is obtained by mixing time-domain signals of several symbols.

3) Reference Signal and Modulation Data

In a data transmission process, generally, in addition to modulation data, a reference signal also needs to be sent, and the reference signal may also be referred to as a pilot signal. The reference signal sent together with the modulation data is a signal known to both the terminal device and the network device, and is mainly used to assist a receive end in demodulating data. Therefore, the reference signal may also be referred to as a demodulation reference signal (DMRS). When data mapped to one subcarrier is a DMRS, the reference signal is sent on the symbol. Generally, the reference signal and the modulation data are located on different symbols, and may occupy a same bandwidth (namely, a same subcarrier location) in frequency domain. For ease of subsequent description, a symbol carrying the modulation data is referred to as a data symbol, and a symbol carrying the reference signal is referred to as a reference signal symbol. The terminal device sends data and a reference signal. After receiving corresponding modulation data and the reference signal, the network device performs operations such as channel estimation and interpolation by using a known reference signal, to estimate a channel response of a symbol in which the data is located, and then performs operations such as equalization and demodulation by using the received data and the estimated channel response, to obtain the sent data through demodulation.

Figure 3:
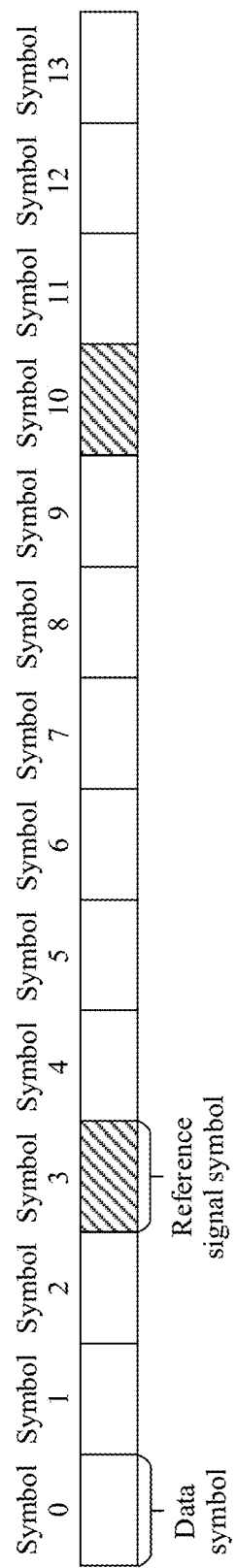
FIG. 3 is a schematic diagram of symbols in which modulation data and reference signals are located according to an embodiment of this application.

In a sending process, a reference signal and modulation data that is generated based on to-be-sent data are generally time-division. To be specific, a symbol in which the reference signal is located is different from a symbol in which the modulation data generated based on the to-be-sent data is located. For example, refer to FIG. 3. In FIG. 3, an example in which a slot includes 14 symbols is used. Symbol indexes in the slot range from 0 to 13. A reference signal is sent in a reference signal symbol, and modulation data generated based on to-be-sent data is sent in a data symbol. In FIG. 3, symbol 3 and symbol 10 are reference signal symbols, and the other symbols are data symbols.

For example, it is assumed that duration of a coefficient (referred to as C(t)) of a time-domain filter is 3×T, and duration of one symbol is T. It may be learned that a reference signal sent on symbol 3 after time-domain filtering is interfered with by data sent on symbol 2 and symbol 4. In other words, when the reference signal and the modulation data are sent by using a single tone waveform, if time-domain filtering is performed and the duration of the time-domain filter exceeds the duration of one symbol, the symbol in which the reference signal is located is interfered with by several adjacent symbols. This affects channel estimation performance, and thereby affects demodulation performance.

Based on this, embodiments of this application provide a signal sending method, a signal receiving method, and an apparatus, to resolve a problem that demodulation performance is affected because a symbol in which a reference signal is located is interfered with by several adjacent symbols.

It may be understood that the method in this application may be applied to a sending device, or may be applied to a receiving device. The sending device may be a terminal device, and the receiving device may be a network device. For example, in the communication system shown in FIG. 1, a terminal device 1 to a terminal device 6 may send data and a reference signal to the network device by using a solution provided in embodiments of this application, and the network device needs to receive the data and the reference signal that are sent by the terminal device 1 to the terminal device 6. Alternatively, the sending device may be a network device, and a receive-end device may be a terminal device. For example, in the communication system shown in FIG. 1, the network device may send data and a reference signal to each of the terminal device 1 to the terminal device 6 by using a solution provided in embodiments of this application, and each of the terminal device 1 to the terminal device 6 needs to receive the data and the reference signal that are sent by the network device. The following describes a method provided in embodiments of this application by using an example in which the sending device is a terminal device and the receiving device is a network device.

Figure 4:
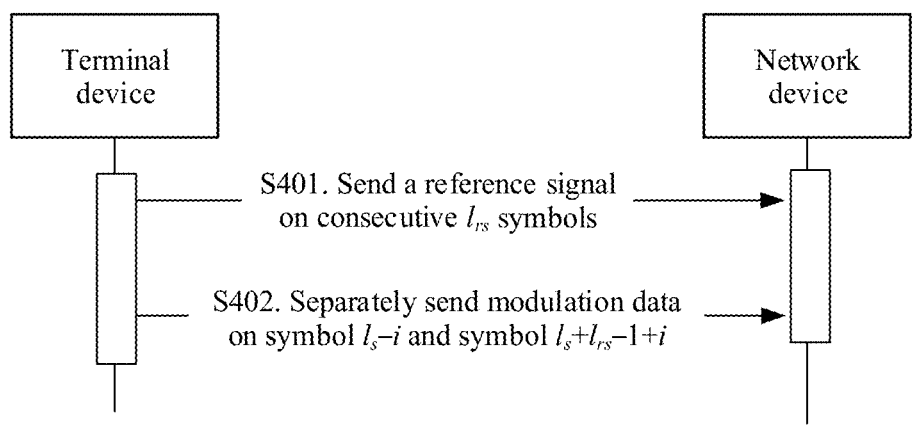
FIG. 4 is a schematic flowchart of an information transmission method according to an embodiment of this application.

As shown in FIG. 4, the method includes steps S401 and S402.

S401. The terminal device sends one or more reference signals to the network device on $L_{rs}$ consecutive symbols, where $L_{rs}$ is a positive integer, and a start symbol index of the $L_{rs}$ symbols is $l_s$. Therefore, the network device receives the one or more reference signals on the $L_{rs}$ consecutive symbols.

S402. The terminal device separately sends modulation data to the network device on symbol $l_s-i$ and symbol $l_s+L_{rs}-1+i$, where i is a positive integer less than or equal to $L_{data}$, and $L_{data}$ is a positive integer. Therefore, the network device separately receives the modulation data on symbol $l_s-i$ and symbol $l_s+L_{rs}-1+i$.

Optionally, the modulation data on symbol $l_s-i$ and the modulation data on the symbol $l_s+L_{rs}-1+i$ are obtained based on same modulation data. Optionally, a data length of the modulation data on symbol $l_s-i$ and a data length of the modulation data on symbol $l_s+L_{rs}-1+i$ are the same as a data length of the same modulation data. For example, both the modulation data on symbol $l_s-1$ and the modulation data on symbol $l_s+L_{rs}$ are modulation data A, or are obtained by transforming A. For example, a sum of the modulation data on symbol $l_s-1$ and the modulation data on symbol $l_s+L_{rs}$ is 0. For example, the modulation data on symbol $l_s-1$ is A, and the modulation data on symbol $l_s+L_{rs}$ is −A; or the modulation data on symbol $l_s-1$ is −A, and the modulation data on symbol $l_s+L_{rs}$ is A.

In a feasible implementation, for example, a symbol for sending a reference signal is referred to as a first symbol, and two different symbols (symbol $l_s-i$ and symbol $l_s+L_{rs}-1+i$) adjacent to the first symbol in time domain are respectively referred to as a second symbol and a third symbol. The terminal device sends the reference signal on the first symbol, sends first modulation data on the second symbol, and sends second modulation data on the third symbol, where a sum of the first modulation data and the second modulation data is 0, or the first modulation data and the second modulation data are the same. Further, the network device receives the reference signal on the first symbol, receives the first modulation data on the second symbol, and receives the second modulation data on the third symbol.

In another feasible implementation, when two first symbols that are consecutive in time domain are used to carry reference signals, when a sum of modulation data on symbol $l_s-i$ and modulation data on symbol $l_s+L_{rs}-1+i$ is 0, a sum of the reference signals respectively carried on the two first symbols that are consecutive in time domain is 0. In another feasible implementation, when two first symbols that are consecutive in time domain are used to carry reference signals, when modulation data on symbol $l_s-i$ and modulation data on symbol $l_s+L_{rs}-1+i$ are the same, the reference signals respectively carried on the two first symbols that are consecutive in time domain are the same.

In still another feasible implementation, when two first symbols that are consecutive in time domain are used to carry reference signals, when modulation data on symbol $l_s-i$ and modulation data on symbol $l_s+L_{rs}-1+i$ are the same, a sum of the reference signals respectively carried on the two first symbols that are consecutive in time domain is 0.

In yet another feasible implementation, when two first symbols that are consecutive in time domain are used to carry reference signals, when a sum of modulation data on symbol $l_s-i$ and modulation data on symbol $l_s+L_{rs}-1+i$ is 0, the reference signals respectively carried on the two first symbols that are consecutive in time domain are the same.

In this embodiment of this application, an index of a symbol may also be referred to as a sequence number or an identifier of the symbol. $l_s-i$ and $l_s+L_{rs}-1+i$ are indexes of symbols. Symbol $l_s-i$ to symbol $l_s+L_{rs}-1+i$ may be $L_{rs}+2i$ symbols in symbols used by the terminal device to transmit data (including modulation data and a reference signal). The index of the symbol may be greater than or equal to 0, or may be equal to 0. An NR system is used as an example. When the terminal device transmits data, one slot (slot) may include 14 symbols. When the 14 symbols are numbered from 0, indexes of the 14 symbols are 0 to 13, and the 14 symbols are respectively symbol 0, symbol 1, . . . , and symbol 13. In this case, it is assumed that symbol $l_s-i$ is the first symbol of the 14 symbols, and symbol $l_s-i$ may be symbol 0. When the 14 symbols are numbered from 1, indexes of the 14 symbols are from 1 to 14, and the 14 symbols are respectively symbol 1, symbol 2, . . . , and symbol 14. In this case, it is assumed that symbol $l_s-i$ is the second symbol of the 14 symbols, and symbol $l_s-i$ may be symbol 2. When the 14 symbols are numbered from −1, indexes of the 14 symbols are from −2 to 11, and the 14 symbols are respectively symbol −2, symbol −1, symbol 0, . . . , and symbol 11. In this case, it is assumed that symbol $l_s-i$ is the second symbol of the 14 symbols, and symbol $l_s-i$ may be symbol −1.

Alternatively, symbol $l_s-i$ to symbol $l_s+L_{rs}-1+i$ may be symbols included in a plurality of slots or a plurality of subframes (subframes), and indexes $l_s-i$ to $l_s+L_{rs}-1+i$ are indexes of symbols in the plurality of slots or the plurality of subframes, that is, symbol $l_s-i$ to symbol $l_s+L_{rs}-1+i$ may span the plurality of slots or the plurality of subframes. For example, symbol $l_s-i$ to symbol $l_s+L_{rs}-1+i$ are in two consecutive slots, symbol indexes in the two slots are 0 to 27 (where one slot includes 14 symbols). In this case, it may be understood that possible values of symbol $l_s-i$ and symbol $l_s+L_{rs}-1+i$ may be $l_s-i \geq 0$, and $l_s+L_{rs}-1+i \leq 27$.

In this embodiment of this application, modulation data or a reference symbol sent on a symbol may be obtained in the following manner: A bit stream including one or more bits is modulated by using a modulation scheme, to obtain one or more complex symbols, and the obtained one or more complex symbols are mapped to one or more time-domain symbols in a one-to-one manner. The bit stream may be obtained in various processing manners. For example, processing such as encoding, interleaving, and scrambling may be performed on an original bit stream to obtain the bit stream. The original bit stream may be obtained based on a service to be sent by the terminal device. This is not limited in this embodiment of this application.

A modulation scheme in this embodiment of this application may be BPSK modulation or Pi/2-BPSK modulation. In this embodiment of this application, data on which BPSK modulation has been performed and is then mapped to a subcarrier may be referred to as BPSK modulation data, and data on which Pi/2-BPSK modulation has been performed and is then mapped to a subcarrier may be referred to as Pi/2-BPSK modulation data. In subsequent descriptions, the BPSK modulation data is used as an example.

Optionally, in this embodiment of this application, when modulation data or a reference signal is sent on a symbol, the modulation data or the reference signal is sent after filtering is performed on the modulation data or the reference signal. For example, the filtering may be time-domain filtering. Specifically, frequency domain resource mapping, inverse Fourier transform, and time-domain filtering processing may be performed on the reference signal or the modulation data, and then the reference signal or the modulation data is sent.

The terminal device may determine, by receiving signaling from the network device, whether to send the data and the reference signal by using the solution provided in this embodiment of this application. For example, one or more bits included in the signaling are used to indicate whether the solution provided in this embodiment of this application is used to send the data and the reference signal. One bit is used as an example. For example, when a value of the one bit is 1, the terminal device may send the data and the reference signal by using the solution provided in this embodiment of this application. When the value of the one bit is 0, the terminal device does not use the solution provided in this embodiment of this application, to send the data and the reference signal. For example, the data and the reference signal are sent in a manner of non-repeated mapping, that is, the modulation data on symbol $l_s-1$ is incorrelate to the modulation data on symbol $l_s+L_{rs}$. For another example, when the value of the one bit is 0, the terminal device may send the data and the reference signal by using the solution provided in this embodiment of this application. When the value of the one bit is 1, the terminal device does not use the solution provided in this embodiment of this application, to send the data and the reference signal.

When the terminal device serves as a receive end, the network device may send signaling to indicate the terminal device whether to receive the data and the reference signal by using the solution provided in this embodiment of this application. It should be understood that when the terminal device serves as the receive end, the network device may alternatively not send a signaling indication. When determining, through parsing, that modulation data on two symbols is the same, the terminal device may discard one of the modulation data. When determining that a sum of the modulation data on the two symbols is 0, the terminal device may alternatively discard one of the modulation data.

In this embodiment of this application, signaling may be semi-static signaling and/or dynamic signaling. The semi-static signaling may be radio resource control (RRC) signaling, a broadcast message, a system message, or a medium access control (MAC) control element (CE). The broadcast message may include remaining minimum system information (RMSI). The dynamic signaling may be physical layer signaling. The physical layer signaling may be signaling carried on a physical control channel or signaling carried on a physical data channel. The physical data channel may be a downlink channel, for example, a physical downlink shared channel (PDSCH). The physical control channel may be a physical downlink control channel (PDCCH), an enhanced physical downlink control channel (EPDCCH), a narrowband physical downlink control channel (NPDCCH), or a machine type communication (MTC) physical downlink control channel (MPDCCH). The physical layer signaling may also be referred to as downlink control information (DCI). The physical control channel may alternatively be a physical sidelink control channel, and signaling carried on the physical sidelink control channel may also be referred to as sidelink control information (SCI).

Example 1: An example in which $L_{rs}$ is 1 and $L_{data}$ is 1 is used. A symbol for sending a reference signal is referred to as a first symbol, that is, an index of the first symbol may be $l_s$. Two symbols adjacent to the first symbol are respectively a second symbol and a third symbol. The second symbol is different from the third symbol. For example, the second symbol is earlier than the third symbol in time domain, that is, an index of the second symbol is $l_s-1$, and an Index of the Third Symbol is $l_s+1$. Certainly, the Second Symbol May be Later than the third symbol in time domain, that is, the index of the second symbol is $l_s+1$, and the index of the third symbol is $l_s-1$. In subsequent descriptions of this embodiment of this application, that the second symbol is earlier than the third symbol in time domain is used as an example. For ease of description, modulation data sent on the second symbol is referred to as first modulation data, and modulation data sent on the third symbol is referred to as second modulation data. Therefore, the terminal device sends the reference signal to the network device on the first symbol, sends the first modulation data to the network device on the second symbol, and sends the second modulation data to the network device on the third symbol. Further, the network device receives the reference signal on the first symbol, receives the first modulation data on the second symbol, and receives the second modulation data on the third symbol. For example, a sum of the first modulation data and the second modulation data is 0, or the first modulation data and the second modulation data are the same.

For example, the first modulation data sent on symbol $l_s-1$ is represented as $d_{left}$, and a data length of $d_{left}$ is 1. The second modulation data sent on symbol $l_s+1$ is represented as $d_{right}$, and a data length of $d_{right}$ is 1. Both the first modulation data and the second modulation data may be determined based on same modulation data $d_{1st}$, and a data length of $d_{1st}$ is 1. It may be $d_{left}=d_{1st}$ and $d_{right}=-d_{1st}$, or may be $d_{left}=-d_{1st}$ and $-d_{right}=d_{1st}$, that is, $-d_{left}=d_{right}$, is satisfied or $d_{left}=-d_{right}$ is satisfied. Alternatively, it may be $d_{left}=d_{1st}$ and $d_{right}=d_{1st}$, that is, $d_{left}=d_{right}$ is satisfied.

Figure 5:
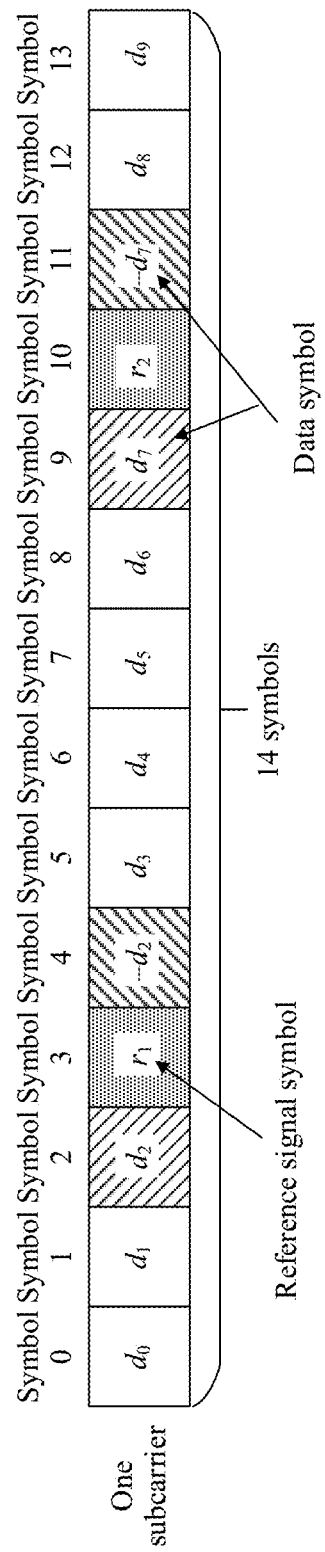
FIG. 5 is a schematic diagram of symbols on which modulation data and reference signals are located in Example 1 according to an embodiment of this application.

Refer to FIG. 5. For example, one slot includes 14 symbols, and symbol indexes are 0 to 13. Reference signals are sent on symbol 3 and symbol 10, and both symbol 3 and symbol 10 may be referred to as reference signal symbols. When a reference signal is sent by using symbol 3 (that is $l_s=3$), it is assumed that $d_{1st}=d_2$, modulation data sent by using symbol 2 is $d_{left}=d_1$, and modulation data sent by using symbol 4 is $d_{right}=-d_{1st}$, that is, the modulation data sent by using symbol 2 and the modulation data sent by using symbol 4 are reverse to each other. Symbol 2 and symbol 4 may be referred to as data symbols.

When the reference signal is sent by using symbol 10 (that is, $l_s=10$), it is assumed that $d_{1st}=d_7$, modulation data sent by using symbol 9 is $d_{left}=d_{1st}$, and modulation data sent by using symbol 11 is $d_{right}=-d_{1st}$, that is, the modulation data sent by using symbol 9 and the modulation data sent by using symbol 11 are reverse to each other.

For example, the first modulation data and the second modulation data may be determined based on modulation data in a first modulation number set $D_{1st}$. Then, in the example shown in FIG. 5, when $D_{1st}=[d_2, d_7]$, and $l_s=3$, the first modulation data and the second modulation data are determined based on $d_2$; when $l_s=10$, the first modulation data and the second modulation data are determined based on $d_7$. As shown in FIG. 5, the terminal device further sends the modulation data on symbols 0, 1, 5, 6, 7, 8, 12, and 13. The modulation data sent by the terminal device on these symbols may be included in a second modulation data set (represented as $D_{2st}$), and the modulation data included in the second modulation data set is $D_{2st}=[d_0, d_1, d_3, d_4, d_5, d_6, d_8, d_9]$. Second modulation data sent on symbol 0 is $d_0$, and second modulation data sent on symbols 1, 5, 6, 7, 8, 12, and 13 is $d_1, d_3, d_4, d_5, d_6, d_8$, and $d_9$ respectively.

The first modulation data set and the second modulation data set may be included in an original modulation data set. Specifically, original modulation data may be divided into the first modulation data set and the second modulation data set. For example, as shown in FIG. 5, it may be learned that the original modulation data set is $[d_0, d_1, d_2, d_3, d_4, d_5, d_6, d_7, d_8, d_9]$. The symbols respectively carry $[d_0, d_1, d_2, d_3, d_4, d_5, d_6, d_7, d_8, d_9]$ may also be referred to as data symbols. The original modulation data set may be obtained by modulating to-be-sent bits.

In FIG. 5, an example in which one slot includes 14 symbols is used. Alternatively, a quantity of symbols included in one slot may be another value. For example, as shown in FIG. 6, one slot may include 15 symbols.

Figure 6:
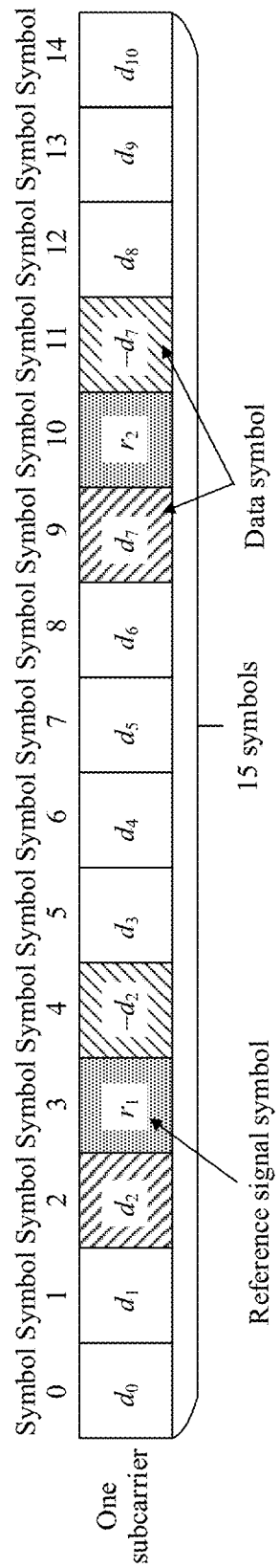
FIG. 6 is another schematic diagram of symbols on which modulation data and reference signals are located in Example 1 according to an embodiment of this application.

It should be understood that, in FIG. 5 or FIG. 6, an example in which reference signals are sent on two symbols in one slot is used. Certainly, one symbol in one slot may be alternatively used to send a reference signal, or a plurality of symbols, for example, three symbols, in one slot may be alternatively used to send a reference signal.

Example 2: An example in which $L_{rs}$ is 2 and $L_{data}$ is 1 is used. Reference signals are sent on two consecutive first symbols, and indexes of the two first symbols carrying the reference signals are $l_s$ and $l_s+1$. First modulation data is sent on symbol $l_s-1$ and second modulation data is sent on symbol $l_s+2$. The modulation data sent on symbol $l_s-1$ and the modulation data sent on symbol $l_s+2$ are obtained by using same modulation data. Each piece of modulation data includes one piece of BPSK modulation data, and the reference signal includes one piece of BPSK modulation data.

In a manner, a sum of the reference signal sent on symbol $l_s$ and the reference signal sent on symbol $l_s+1$ is 0, and a sum of the first modulation data sent on symbol $l_s-1$ and the second modulation data sent on symbol $l_s+2$ is 0. In other words, the reference signal sent on symbol $l_s$ and the reference signal sent on symbol $l_s+1$ are reverse to each other, and the modulation data sent on symbol $l_s-1$ and the modulation data sent on symbol $l_s+2$ are reverse to each other.

For example, the reference signal sent on symbol $l_s$ is represented as $r_{rs1}$, the reference signal sent on $l_s+1$ is represented as $r_{rs2}$, the modulation data sent on symbol $l_s-1$ is represented as $d_{left}$, and the modulation data sent on symbol $l_s+2$ is represented as $d_{right}$. The data lengths of $r_{rs1}$, $r_{rs2}$, $d_{left}$, and $d_{right}$ are all 1. The reference signal sent on symbol $l_s$ and the reference signal sent on symbol $l_s+1$ are reverse to each other, and the modulation data sent on symbol $l_s-1$ and the modulation data sent on symbol $l_s+2$ are reverse to each other. In other words, $r_{rs1}=-r_{rs2}$, and $d_{left}=-d_{right}$.

Figure 7:
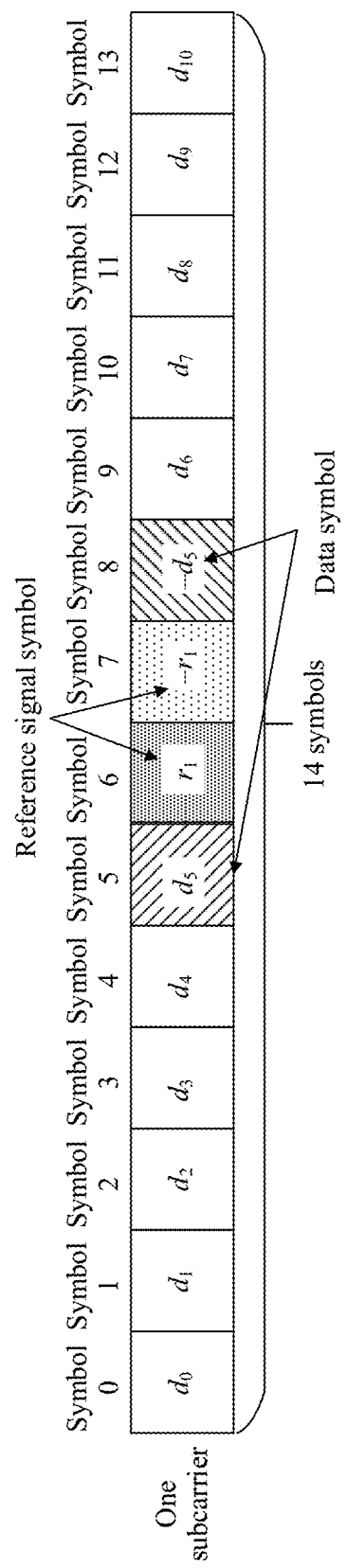
FIG. 7 is a schematic diagram of symbols on which modulation data and reference signals are located in Example 2 according to an embodiment of this application.

As shown in FIG. 7, for example, one slot includes 14 symbols, and symbol indexes range from 0 to 13. Reference signals are sent on symbol 6 and symbol 7 (that is, $l_s=6$). When the reference signal sent by using symbol 6 is $r_1$ (that is, $r_{rs1}=r_1$), the reference signal sent by using symbol 7 is $-r_1$ (that is, $r_{rs2}=-r_1$). First modulation data sent on symbol 5 (that is, $l_s-1$) is $d_5$ (that is, $d_{left}=d_5$), and modulation data sent on symbol 8 is $-d_5$ (that is, $d_{right}=-d_5$). As shown in FIG. 7, a terminal device further sends modulation data on symbols 0, 1, 2, 3, 4, 9, 10, 11, 12, and 13. In the example shown in FIG. 7, $D_{1st}=[d_5]$, and $D_{2st}=[d_0, d_1, d_2, d_3, d_4, d_6, d_7, d_8, d_9, d_{10}]$.

Figure 8:
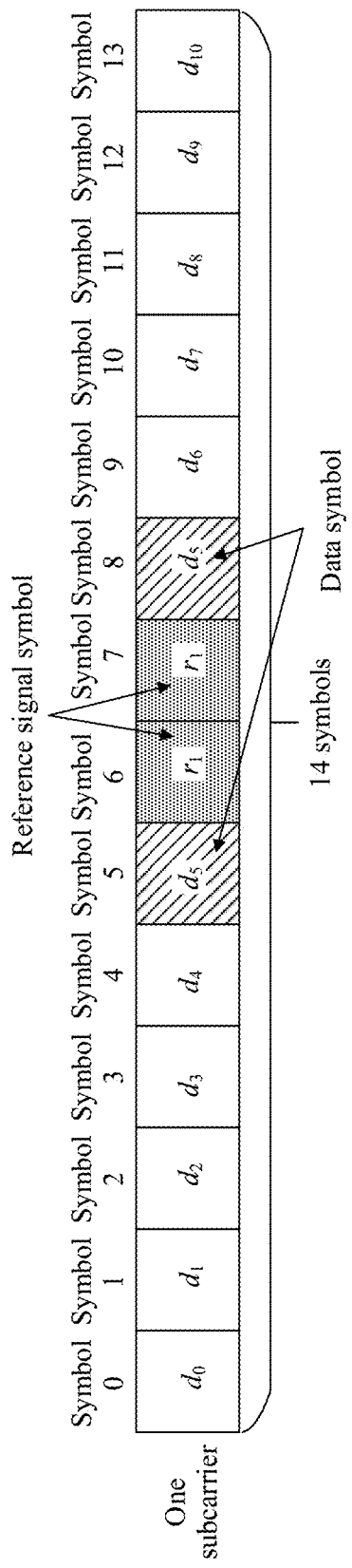
FIG. 8 is another schematic diagram of symbols on which modulation data and reference signals are located in Example 2 according to an embodiment of this application.

In another manner, the reference signal sent on symbol $l_s$ and the reference signal sent on symbol $l_s+1$ are the same, and first modulation data sent on symbol $l_s-1$ and second modulation data sent on symbol $l_s+2$ are the same. As shown in FIG. 8, for example, one slot includes 14 symbols, and symbol indexes range from 0 to 13. Reference signals are sent on symbol 6 and symbol 7 (that is, $l_s=3$). When the reference signal sent by using symbol 6 is $r_1$ (that is, $r_{rs1}=r_1$), the reference signal sent by using symbol 7 is $r_1$ (that is, $r_{rs2}=r_1$). First modulation data sent on symbol 5 (that is, $l_s-1$) is $d_5$ (that is, $d_{left}=d_5$), and modulation data sent on symbol 8 is $d_5$ (that is, $d_{right}=d_5$). As shown in FIG. 8, a terminal device further respectively sends modulation data $[d_0, d_1, d_2, d_3, d_4, d_6, d_7, d_8, d_9, d_{10}]$ on symbols 0, 1, 2, 3, 4, 9, 10, 11, 12, and 13.

Example 3: An example in which $L_{rs}=1$ and $L_{data}>1$ is used. A reference signal is sent on a first symbol, and an index of the first symbol carrying the reference signal is $l_s$. For example, $L_{data}=2$. First modulation data is sent on a second symbol (symbol $l_s-1$), second modulation data is sent on a third symbol (symbol $l_s+1$), third modulation data is sent on a fourth symbol (for example, symbol is −2), and fourth modulation data is sent on symbol 5 (symbol $l_s+2$). The first modulation data sent on symbol $l_s-1$ and the second modulation data sent on $l_s+1$ are obtained by using same modulation data, and the third modulation data sent on symbol $l_s-2$ and the fourth modulation data sent on symbol $l_s+2$ are obtained by using same modulation data. Each piece of modulation data includes one piece of BPSK modulation data, and the reference signal includes one piece of BPSK modulation data.

Figure 9:
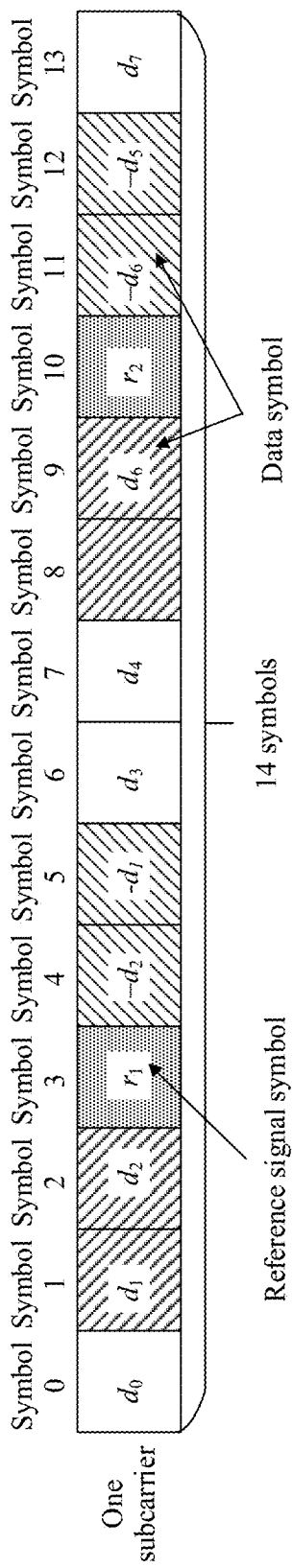
FIG. 9 is a schematic diagram of symbols on which modulation data and reference signals are located in Example 3 according to an embodiment of this application.

In a manner, a sum of the first modulation data sent on symbol $l_s-1$ and the second modulation data sent on symbol $l_s+1$ is 0, and a sum of the third modulation data sent on symbol $l_s-2$ and the fourth modulation data sent on symbol $l_s+2$ is 0. As shown in FIG. 9, for example, one slot includes 14 symbols, and symbol indexes range from 0 to 13. Reference signals are sent on symbols 3 and symbol 10, and modulation data is sent on the other symbols. When a reference signal is sent by using symbol 3 (that is, $l_s=3$), a sum of first modulation data (that is, $d_2$) sent on symbol 2 and second modulation data (that is, $-d_2$) sent on symbol 4 is 0. A sum of third modulation data (that is, $d_1$) sent on symbol 1 and fourth modulation data (that is, $-d_1$) sent on symbol 5 is 0. When a reference signal is sent by using symbol 10 (that is, $l_s=10$), a sum of modulation data (that is, $d_6$) sent on symbol 9 and modulation data (that is, $-d_6$) sent on symbol 11 is 0, and a sum of modulation data (that is, $d_5$) sent on symbol 8 and modulation data (that is, $-d_5$) sent on symbol 12 is 0.

Figure 10:
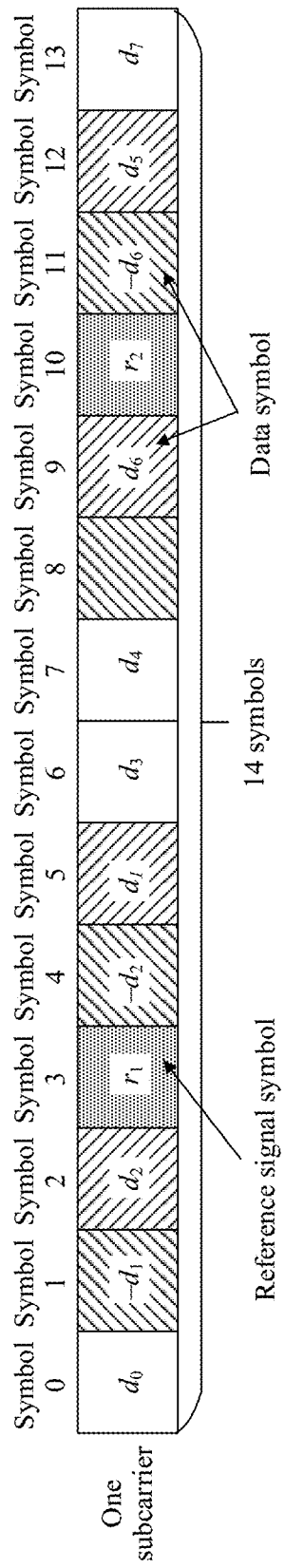
FIG. 10 is another schematic diagram of symbols on which modulation data and reference signals are located in Example 3 according to an embodiment of this application.

A sum of first modulation data sent on symbol $l_s-1$ and second modulation data sent on symbol $l_s+1$ is 0, and a sum of third modulation data sent on symbol $l_s-2$ and fourth modulation data sent on symbol $l_s+2$ is 0. Another possible manner is shown in FIG. 10. For example, one slot includes 14 symbols, and symbol indexes range from 0 to 13. Reference signals are sent on symbols 3 and symbol 10, and modulation data is sent on the other symbols. When a reference signal is sent by using symbol 3 (that is, $l_s=3$), first modulation data sent on symbol 2 is $d_2$ and second modulation data sent on symbol 4 is $-d_2$. Third modulation data sent on symbol 1 is $-d_1$, and fourth modulation data sent on symbol 5 is $d_1$. When a reference signal is sent by using symbol 10 (that is, $l_s=10$), modulation data sent on symbol 9 is $d_6$, modulation data sent on symbol 11 is $-d_6$, modulation data sent on symbol 8 is $-d_5$, and modulation data sent on symbol 12 is $d_5$.

Figure 11:
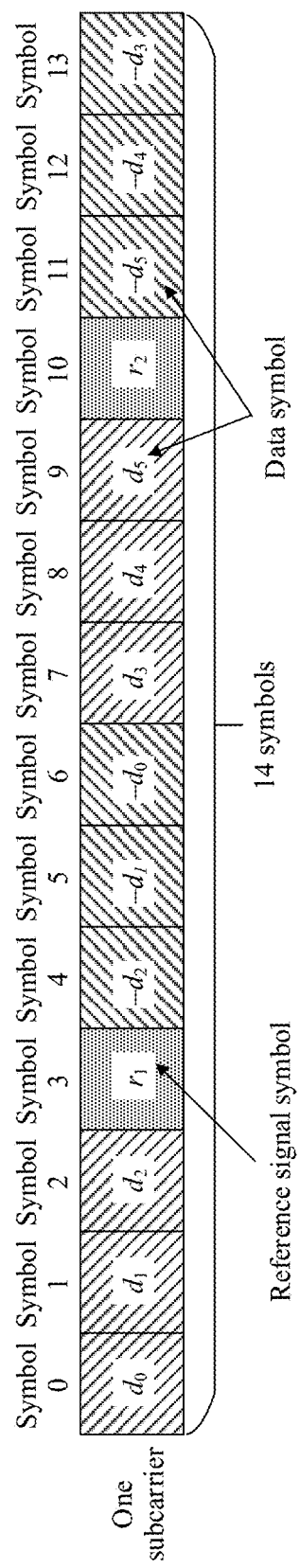
FIG. 11 is a schematic diagram of symbols on which modulation data and reference signals are located in Example 4 according to an embodiment of this application.

Example 4: An example in which $L_{rs}$ is 1 and $L_{data}=3$ is used. Modulation data sent on symbol $l_s-1$ and modulation data sent on symbol $l_s+1$ are obtained based on same modulation data. Modulation data sent on symbol $l_s-2$ and modulation data sent on symbol $l_s+2$ are obtained based on same modulation data. Modulation data sent on symbol $l_s-3$ and modulation data sent on symbol $l_s+3$ are obtained based on same modulation data. For example, refer to FIG. 11. That a sum of modulation data on symbol $l_s-i$ and modulation data on symbol $l_s+L_{rs}-1+i$ is 0 is used as an example. As shown in FIG. 11, one slot includes 14 symbols, and symbol indexes range from 0 to 13. Reference signals are sent on symbols 3 and symbol 10, and modulation data is sent on the other symbols. When a reference signal is sent by using symbol 3 (that is, $l_s=3$), a sum of first modulation data (that is, $d_2$) sent on symbol 2 and second modulation data (that is, $-d_2$) sent on symbol 4 is 0. A sum of third modulation data (that is, $d_1$) sent on symbol 1 and fourth modulation data (that is, $-d_1$) sent on symbol 5 is 0. A sum of third modulation data (that is, $d_0$) sent on symbol 0 and fourth modulation data (that is, $-d_0$) sent on symbol 6 is 0. When a reference signal is sent by using symbol 10 (that is, $l_s=10$), a sum of modulation data (that is, $d_5$) sent on symbol 9 and modulation data (that is, $-d_5$) sent on symbol 11 is 0, and a sum of modulation data (that is, $d_4$) sent on symbol 8 and modulation data (that is, $-d_4$) sent on symbol 12 is 0. A sum of modulation data (that is, $d_3$) sent on symbol 7 and modulation data sent on symbol 13 (that is, $-d_3$) is 0.

Example 5: An example in which $L_{rs}$ is 2 and $L_{data}>1$ is used. Reference signals are sent on two consecutive first symbols, and indexes of the two first symbols carrying the reference signals are $l_s$ and $l_s+1$. For example, $L_{data}=2$. First modulation data is sent on a second symbol (symbol $l_s-1$), second modulation data is sent on a third symbol (symbol $l_s+2$), third modulation data is sent on a fourth symbol (for example, symbol $l_s-2$), and fourth modulation data is sent on a fifth symbol (symbol $l_s+3$). The first modulation data sent on symbol $l_s-1$ and the second modulation data sent on $l_s+2$ are obtained by using same modulation data, and the third modulation data sent on symbol $l_s-2$ and the fourth modulation data sent on symbol $l_s+3$ are obtained by using same modulation data. Each piece of modulation data includes one piece of BPSK modulation data, and the reference signal includes one piece of BPSK modulation data.

In a manner, a sum of the reference signal sent on symbol $l_s$ and the reference signal sent on symbol $l_s+1$ is 0, a sum of the first modulation data sent on symbol $l_s-1$ and the second modulation data sent on symbol $l_s+2$ is 0, and a sum of the third modulation data sent on symbol $l_s-2$ and the fourth modulation data sent on symbol $l_s+3$ is 0. In other words, the reference signal sent on symbol $l_s$ and the reference signal sent on symbol $l_s+1$ are reverse to each other, the modulation data sent on symbol $l_s-1$ and the modulation data sent on symbol $l_s+2$ are reverse to each other, and the third modulation data sent on symbol $l_s-2$ and the fourth modulation data sent on symbol $l_s+3$ are reverse to each other.

Figure 12:
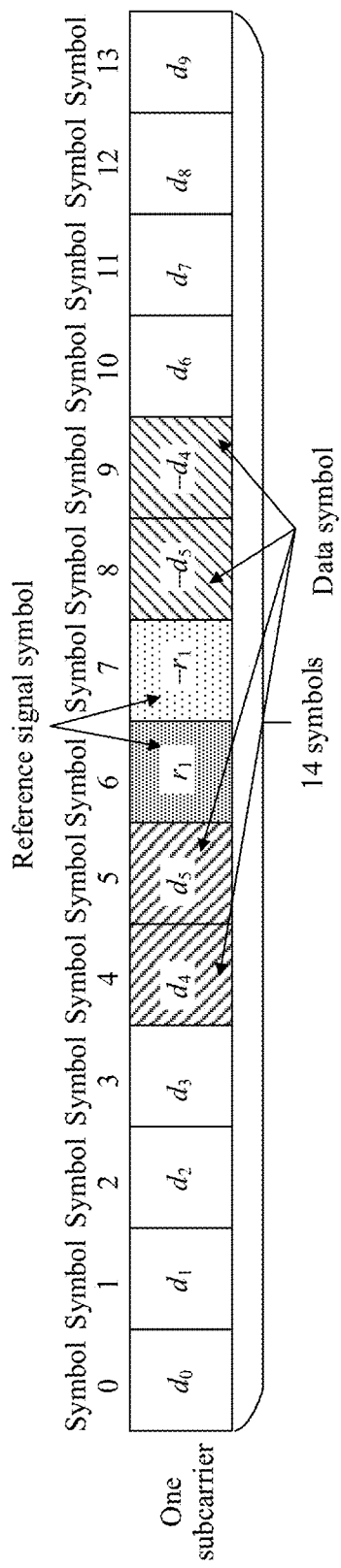
FIG. 12 is a schematic diagram of symbols on which modulation data and reference signals are located in Example 5 according to an embodiment of this application.

As shown in FIG. 12, for example, one slot includes 14 symbols, and symbol indexes range from 0 to 13. Reference signals are sent on symbol 6 and symbol 7 (that is, $l_s=6$). The reference signal sent on symbol 6 is $r_1$ and the reference signal sent on symbol 7 is $-r_1$. Modulation data sent on symbol 5 is $d_5$, modulation data sent on symbol 8 is $-d_5$, modulation data sent on symbol 4 is $d_4$, and modulation data sent on symbol 9 is $-d_4$. As shown in FIG. 12, a terminal device further respectively sends modulation data $d_0$, $d_1$, $d_2$, $d_3$, $d_6$, $d_7$, $d_8$, $d_9$ on symbols 0, 1, 2, 3, 10, 11, 12, and 13.

Figure 13:
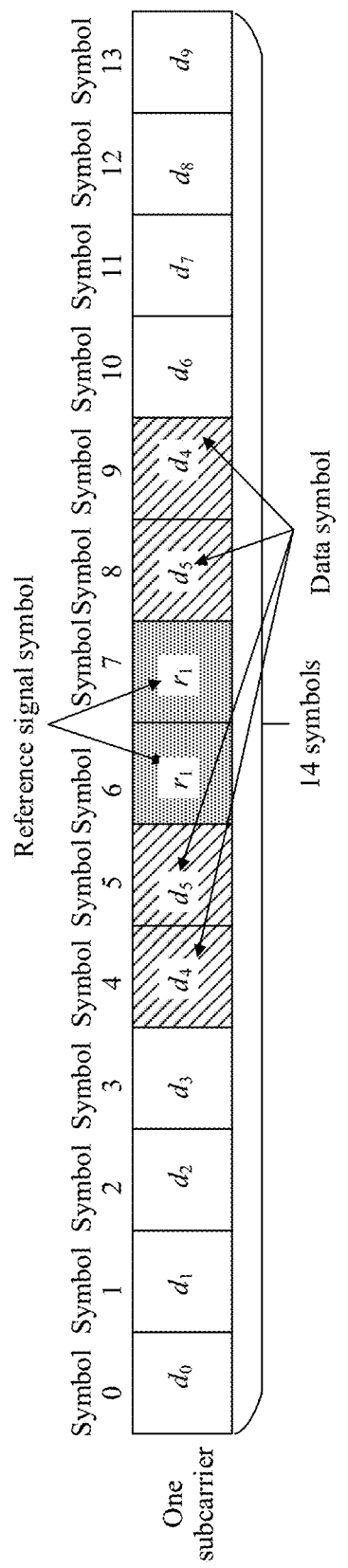
FIG. 13 is another schematic diagram of symbols on which modulation data and reference signals are located in Example 5 according to an embodiment of this application.

In another manner, a reference signal sent on symbol $l_s$ and a reference signal sent on symbol $l_s+1$ are the same, first modulation data sent on symbol $l_s-1$ and second modulation data sent on symbol $l_s+2$ are the same, and third modulation data sent on symbol $l_s-2$ and fourth modulation data sent on symbol $l_s+3$ are the same. As shown in FIG. 13, for example, one slot includes 14 symbols, and symbol indexes range from 0 to 13. Reference signals are sent on symbol 6 and symbol 7 (that is, $l_s=6$). The reference signal sent on symbol 6 is $r_1$ and the reference signal sent on symbol 7 is $r_1$. Modulation data sent on symbol 5 is $d_5$, modulation data sent on symbol 8 is $d_5$, modulation data sent on symbol 4 is $d_4$, and modulation data sent on symbol 9 is $d_4$.

Figure 14:
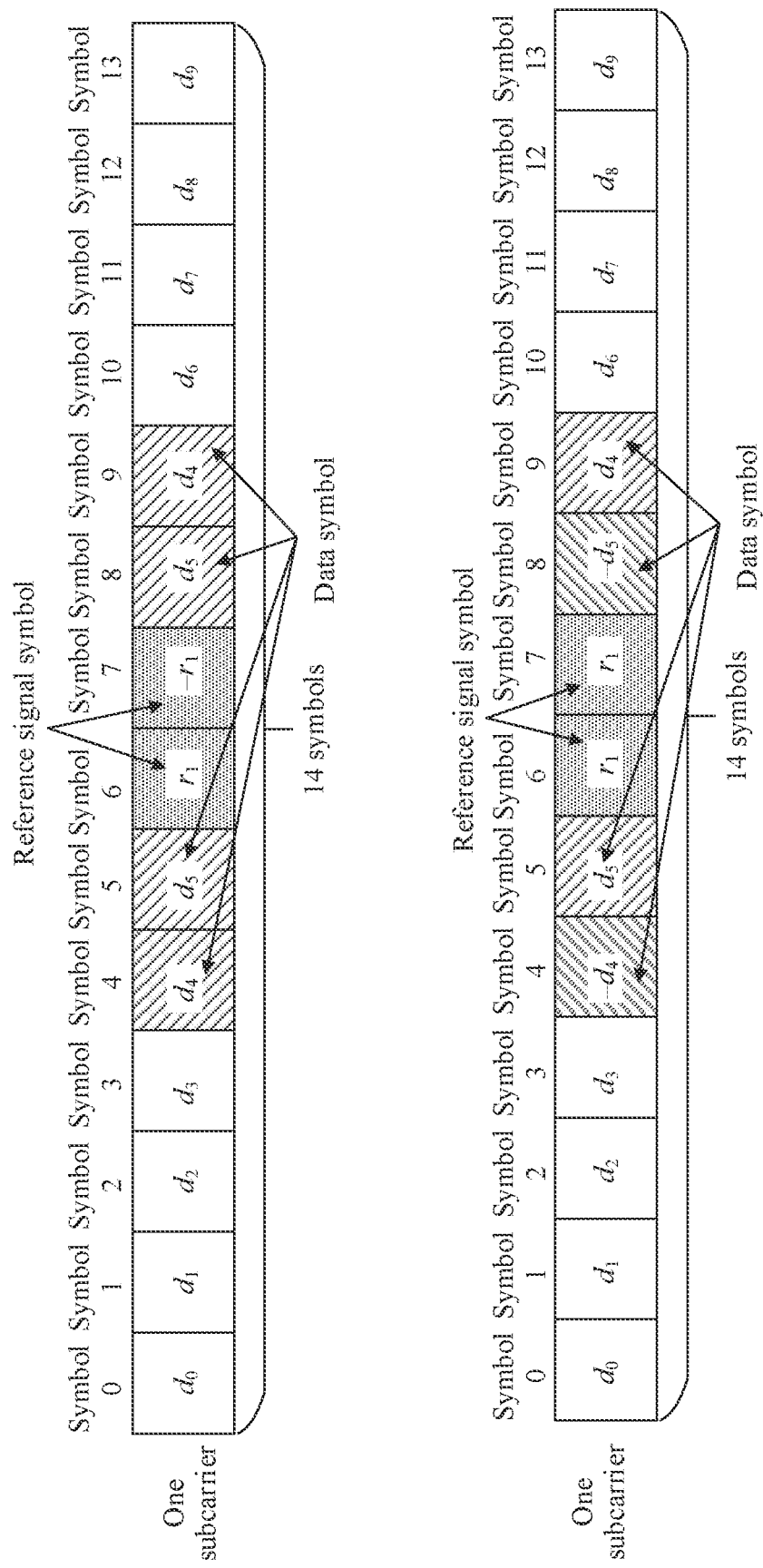
FIG. 14(1) and FIG. 14(2) are still another schematic diagram of symbols on which modulation data and reference signals are located in Example 5 according to an embodiment of this application.

In still another manner, a sum of the reference signal sent on symbol $l_s$ and the reference signal sent on symbol $l_s+1$ is 0, first modulation data sent on symbol $l_s-1$ and second modulation data sent on symbol $l_s+2$ are the same, and third modulation data sent on symbol $l_s-2$ and fourth modulation data sent on symbol $l_s+3$ are the same. As shown in FIG. 14(1), for example, one slot includes 14 symbols, and symbol indexes range from 0 to 13. Reference signals are sent on symbol 6 and symbol 7 (that is, $l_s=6$). The reference signal sent on symbol 6 is $r_1$ and the reference signal sent on symbol 7 is $-r_1$. Modulation data sent on symbol 5 is $d_5$, modulation data sent on symbol 8 is $d_5$, modulation data sent on symbol 4 is $d_4$, and modulation data sent on symbol 9 is $d_4$.

In another manner, the reference signal sent on symbol $l_s$ and the reference signal sent on symbol $l_s+1$ are the same, a sum of first modulation data sent on symbol $l_s-1$ and second modulation data sent on symbol $l_s+2$ is 0, and a sum of third modulation data sent on symbol $l_s-2$ and fourth modulation data sent on symbol $l_s+3$ is 0. As shown in FIG. 14(2), for example, one slot includes 14 symbols, and symbol indexes range from 0 to 13. Reference signals are sent on symbol 6 and symbol 7 (that is, $l_s=6$). The reference signal sent on symbol 6 is $r_1$ and the reference signal sent on symbol 7 is $r_1$. Modulation data sent on symbol 5 is $d_5$, modulation data sent on symbol 8 is $-d_5$, modulation data sent on symbol 4 is $-d_4$, and modulation data sent on symbol 9 is $d_4$.

To improve enhanced data coverage, in this embodiment of this application, to-be-sent data may be repeatedly sent for a plurality of times. For example, a resource for carrying the to-be-sent data may be referred to as a resource unit (RU). To improve modulation performance, in this embodiment of this application, a quantity of symbols included in an RU is related to a quantity of repetitions of data on the RU. To-be-sent data and to-be-modulated reference signal are modulated to obtain modulation data and a reference signal that are sent on symbols. For different quantities of repetition times, the RU may include different quantities of slots, that is, include different quantities of symbols. Modulation data and a reference signal in each slot may be sent or received according to the solution provided in any one of the embodiments corresponding to FIG. 4 to FIG. 14(1) and FIG. 14(2). It should be noted that an index of a symbol in this embodiment of this application may be a number of the symbol in one slot, or may be a number of the symbol in one RU.

Optionally, a configured quantity of repetition times may be K or $K_N$. K is a positive integer, and $K_N$ is a positive integer. K configured for different terminal devices may be the same or different, and K configured for different to-be-sent data of a same terminal device may be the same or different. For example, $K_N$ may be determined based on N. For example, an expression $K_N=2^N$ is used to determine $K_N$, or $K_N$ may be configured, or an N value is configured. N values configured for different terminal devices may be the same or different, and N values configured for different to-be-sent data of a same terminal device may be the same or different.

Optionally, the quantity of times of sending the data on the RU is K, and the quantity of symbols included in the RU are $N_{symb}^{RU}=f(K)\times M$. For example, $M=N_{slot}^{RU}\times N_{symb}^{slot}$. For example, a quantity of slots included in one RU is $f(K)\times N_{slot}^{RU}$ and a quantity of symbols included in one slot is $N_{symb}^{slot}$. For another example, a quantity of slots included in one RU is $N_{slot}^{RU}$ and a quantity of symbols included in one slot is $f(K)\times N_{symb}^{slot}$.

For example, when a quantity of times of sending data on the RU is 1, that is, K=1, a quantity of symbols included in one RU is $N_{symb}^{RU}=M$. For another example, when a quantity of times of sending data on a configured RU is greater than 1 and is an even number, that is, K>1, and K is an even number, a quantity of symbols included in one RU is $N_{symb}^{RU}=2\times M$.

In a case, when the method for sending a reference signal and modulation data provided in this embodiment of this application is used and the method provided in this embodiment of this application is not used (for example, a single tone waveform in a narrow band internet of things (NB-IoT) scenario in an LTE system is used), configured quantities of sending times are both K, when the solution provided in this embodiment of this application is not used, a quantity of symbols on one RU remains unchanged when the quantity of sending times changes, to be specific, to-be-sent data is sent for K times on K RUs, and a total quantity of symbols occupied by the to-be-sent data sent for K times is $K\times N_{slot}^{RU}\times N_{symb}^{slot}$. When the method provided in this embodiment of this application is used, for example, a configured quantity of sending times is K=1, the quantity of the symbols included in one RU is $N_{symb}^{RU}$. During actual sending, data on the RU is sent once, and to-be-sent data is sent on one RU. For example, refer to sending in FIG. 4 to FIG. 14(1) and FIG. 14(2). For another example, if the configured quantity of sending times is K>1, and K is an even number, during actual sending, to improve demodulation performance, the quantity of the symbols included in one RU is $N_{symb}^{RU}=f(K)\times M=f(K)\times N_{slot}^{RU}\times N_{symb}^{slot}$, and the quantity of data sending times on the RU is K/f(K). For example, K>1, and K is an even number, f(K)=2, and an actual quantity of times of sending data on an RU is K/2, that is, to-be-sent data is sent on K/2 RUs for a total of K/2 times, and a quantity of symbols included in K/2 RUs is $K\times N_{slot}^{RU}\times N_{symb}^{slot}$.

In another case, different configuration solutions may be used for the quantity of sending times that is configured when the method for sending a reference signal and modulation data provided in this embodiment of this application is used and the quantity of sending times that is configured when the method provided in this embodiment of this application is not used. For example, when the solution provided in this embodiment of this application is not used, a configured quantity of sending times is K, the quantity of the symbols on one RU is $N_{symb}^{RU}=M$, and an actual quantity of sending times is K. When the solution provided in this embodiment of this application is used, the configured quantity of sending times is K', and the quantity of the symbols included in one RU is $N_{symb}^{RU}=f(K')\times M$. For example, when K'=1, f(K')=1. For another example, when K'>1, f(K')=2. Optionally, K' configured when the method for sending a reference signal and modulation data provided in this embodiment of this application is used may be less than K configured when the method provided in this embodiment of this application is not used. For example, K=K'*f(K') may be satisfied.

It can be learned from the foregoing two examples that a quantity of pieces of data sent in an RU may be increased by reducing a quantity of repetition times of to-be-sent data and increasing a quantity of symbols included in the RU, to reduce a coding code rate and improve data demodulation performance.

Figure 15:
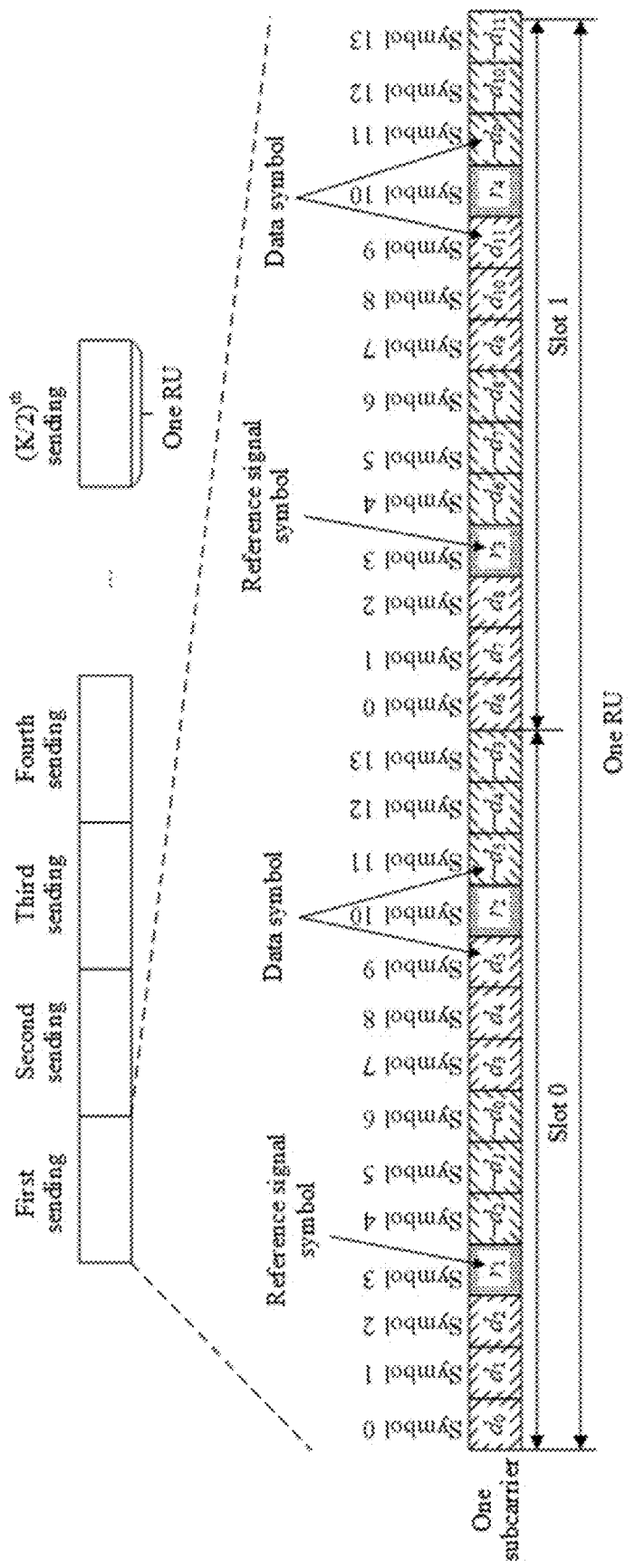
FIG. 15 is a schematic diagram of symbols on which modulation data and reference signals are located in Example 6 according to an embodiment of this application.

Example 6: As shown in FIG. 15, K/2 repetition is performed for data in one RU. It is assumed in the figure that when a quantity of repetition times is 1, one RU includes one slot (that is, $N_{slot}^{RU}=1$), one slot includes 14 symbols, and sent data is shown in FIG. 11. A quantity of times of repeatedly sending the data on the RU configured in FIG. 15 is K. When K is an even number, a quantity of slots included in the RU is 2, and a quantity of symbols included in each slot is 14, that is, a quantity of symbols included in one RU is 28. In this case, a quantity of pieces of modulation data that can be sent in one RU is 12 (from $d_0$ to $d_{11}$). If a sending manner in which K repetition is performed for data in one RU, a quantity of slots included in one RU is 1, and a quantity of symbols included in one slot is 14 is used, the quantity of pieces of modulation data that can be sent in one RU is 6. In comparison with this solution, when data of a same transport block size (transport block size, TBS) is sent by using the foregoing described solution in which K/2 repetition is performed for data in one RU, a coding code rate for sending data in one RU is lower, and demodulation performance is better.

In this embodiment of this application, when modulation data or a reference signal is sent on a symbol, the modulation data or the reference signal may be sent after filtering is performed on the modulation data or the reference signal. For example, the filtering may be time-domain filtering. Specifically, frequency domain resource mapping, inverse Fourier transform, and time-domain filtering processing may be performed on the reference signal or the modulation data, and then the reference signal or the modulation data is sent.

The modulation data or the reference signal on symbol 1 is used as an example. For example, the modulation data is modulation data obtained after BPSK modulation is performed on to-be-sent bits. When BPSK data (modulation data or a reference signal) on symbol 1 is transmitted, Pi/2 phase rotation is performed on the BPSK data on symbol 1 to obtain rotation data. The rotation data includes one piece of data. One piece of the BPSK data on symbol 1 may be modulation data or a reference signal generated based on the to-be-sent bits.

For example, if the BPSK data is represented as $b_l$, and the rotation data is represented as $d_l$, an implementation of the Pi/2 phase rotation is expression (1):

$$d_l = b_l \times e^{\frac{j \times \pi \times (l \bmod 2)}{2}} \quad (1)$$

The rotation data is mapped to a corresponding frequency domain resource in a resource mapping manner. Specifically, the rotation data is mapped to one subcarrier, and a location (or referred to as an index) of the subcarrier is represented as k. After the resource mapping is performed on the rotation data, inverse Fourier transform is performed on the rotation data to obtain time-domain output data $x_l(t)$ of symbol 1. Because the rotation data includes one piece of data, an output of the Fourier transform may be expressed as expression (2):

$$x_l(t)=d_l \times e^{j \times \phi_{offset}} \times e^{j \times 2 \times \pi \times (k+k_{offset}) \times \Delta f \times (t+t_{offset})} \quad (2)$$

$e^{j \times \phi_{offset}}$ is a phase shift, and may be predefined, or may be determined based on a symbol index l. For example, when $\phi_{offset}=0$, there is no phase shift. Expression (2) may be transformed into $x_l(t)=d_l \times e^{j \times 2 \times \pi \times (k+k_{offset}) \times \Delta f \times (t+t_{offset})}$.

$k_{offset}$ is a frequency offset factor, and may be a predefined fixed value, for example $k_{offset}=1/2$. $t_{offset}$ is a time-domain offset factor, and may be a predefined fixed value, where $0 \leq t < N \times T_s$, and N is a positive integer. $T_s$ is a time unit factor, and $T_s$ may be defined on a terminal device, or may be configured by a network device for the terminal device by using signaling. $\Delta f$ is a subcarrier spacing. For example, $\Delta f=1/(N \times T_s)$. For example, when N=2018, and $T_s=1/(2018 \times 15000)$ s, $\Delta f=15000$ hertz (Hz).

Time-domain filtering is performed on the time-domain output data $x_l(t)$ to obtain a time-domain signal $s_l(t)$ of a symbol 1, and the terminal device sends the time-domain signal $s_l(t)$. A coefficient of the time-domain filter is represented as C(t), and a length, namely, duration, of the filter is L×T. A time-domain filtering operation may be implemented by using a polyphase network (polyphase network, PPN). Correspondingly, time-domain filtering may be implemented by using expression (3):

$$s_l(t) = \sum_{l'=k1}^{l'=k2} x_{l'}(t) \cdot C(t + \text{offset} - l' \times T) \quad (3)$$

T=N×$T_s$, and T is also duration of a symbol. k1 is an integer greater than or equal to 0, and k2 is an integer greater than or equal to k1. Optionally, a value of k2−k1 may be related to a value of L in the length L×T of the filter, for example, k2−k1=L−1. offset is an offset value, and offset may be predefined, or may be configured by the network device for the terminal by using signaling. Optionally, offset may be l×T or l×T+⌊L/2⌋×T. ⌊ ⌋ represents rounding down.

Based on this, the time-domain signal $s_l(t)$ may be specifically represented by using the following expression (4):

$$s_l(t) = \left[ \sum_{l'=k1}^{l'=k2} d_{l'} \times C(t + \text{offset} - l' \times T) \right] \times \quad (4)$$
$$e^{j \times \phi_{offset}} \times e^{j \times 2 \times \pi \times (k+k_{offset}) \times \Delta f \times (t+t_{offset})} =$$
$$\tilde{x}_l(t) \times e^{j \times \phi_{offset}} \times e^{j \times 2 \times \pi \times (k+k_{offset}) \times \Delta f \times (t+t_{offset})}$$

It may be determined from expression (4) that, the foregoing data generation process may alternatively be equivalent to: performing time-domain filtering on the rotation data $d_l$ by using a filter C(t) to obtain output data $\tilde{x}_l(t)$, and then using the following phase factors for the output data $\tilde{x}_l(t)$:

$$e^{j \times \phi_{offset}} \times e^{j \times 2 \times \pi \times (k+k_{offset}) \times \Delta f \times (t+t_{offset})}$$

Performing frequency shift to obtain a time-domain signal $s_l(t)$.

Based on this, when one piece of BPSK data on the symbol 1 is data known to the network device, that is, the BPSK data is a reference signal, the network device may use the known reference signal to perform operations such as channel estimation and equalization, to demodulate the BPSK data generated by using the to-be-sent bits. The reference signal may be obtained by performing BPSK modulation on bit data known to the network device. For example, the known bit data may be generated by using a pseudo noise sequence (for example, a pseudo noise sequence or a Gold sequence), and an initialization value of the pseudo noise sequence may be determined by using a cell identifier or an identifier of the terminal device. Therefore, the network device can determine the bit data generated by using the pseudo noise sequence.

In correspondence to the method provided in the foregoing method embodiments, an embodiment of this application further provides a corresponding apparatus. The apparatus includes a corresponding module configured to perform the foregoing embodiment. The module may be software, hardware, or a combination of software and hardware.

Figure 16:
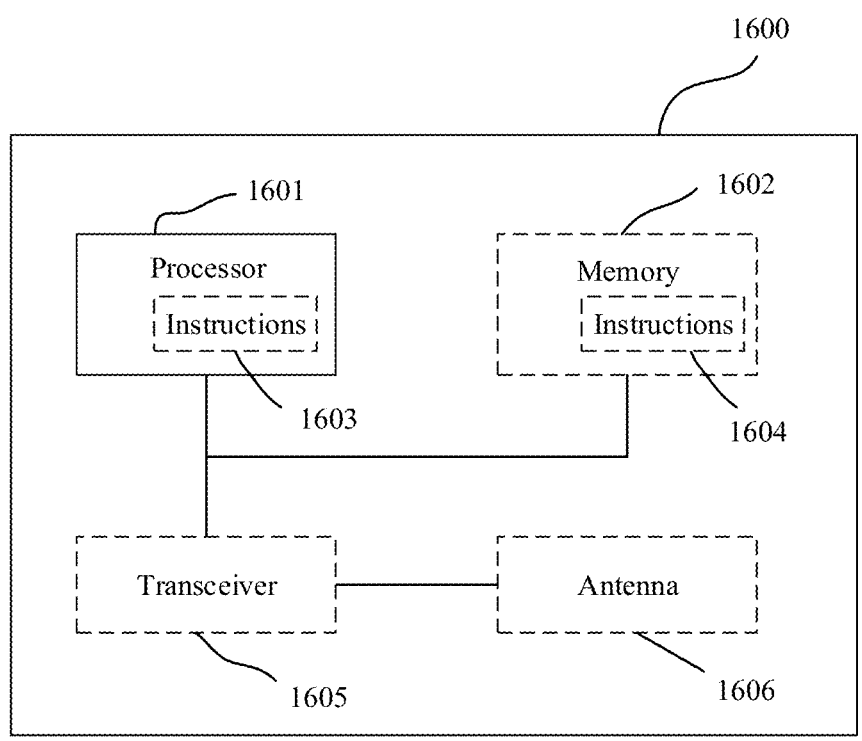
FIG. 16 is a schematic diagram of a structure of an apparatus 1600 according to an embodiment of this application.

FIG. 16 is a schematic diagram of a structure of an apparatus. The apparatus 1600 may be a network device; or may be a terminal device; or may be a chip, a chip system, a processor, or the like that supports the network device in implementing the foregoing method; or may be the chip, the chip system, the processor, or the like that supports the terminal device in implementing the foregoing method. The apparatus may be configured to implement the methods described in the foregoing method embodiments. For details, refer to the descriptions in the foregoing method embodiments.

The apparatus 1600 may include one or more processors 1601. The processor 1601 may also be referred to as a processing unit, and can implement a control function. The processor 1601 may be a general-purpose processor, a dedicated processor, or the like. For example, the processor 1601 may be a baseband processor or a central processing unit. The baseband processor may be configured to process a communication protocol and communication data. The central processing unit may be configured to control a communication apparatus (for example, a base station, a baseband chip, a terminal, a terminal chip, a DU, or a CU), execute a software program, and process data of the software program.

In an optional design, the processor 1601 may alternatively store instructions and/or data 1603, and the instructions and/or data 1603 may be run by the processor, to enable the apparatus 1600 to perform the method described in the foregoing method embodiments.

In another optional design, the processor 1601 may include a transceiver unit configured to implement receiving and sending functions. For example, the transceiver unit may be a transceiver circuit, an interface, or an interface circuit. The transceiver circuit, the interface, or the interface circuit configured to implement the sending function and the transceiver circuit, the interface, or the interface circuit configured to implement the receiving function may be separated, or may be integrated together. The transceiver circuit, the interface, or the interface circuit may be configured to read and write code or data. Alternatively, the transceiver circuit, the interface, or the interface circuit may be configured to transmit or transfer a signal.

In still another possible design, the apparatus 1600 may include a circuit, and the circuit may implement the sending, receiving, or communication function in the foregoing method embodiments.

Optionally, the apparatus 1600 may include one or more memories 1602. The memory 1602 stores instructions 1604, and the instructions may be run on the processor, to enable the apparatus 1600 to perform the method described in the foregoing method embodiments. Optionally, the memory may further store data. Optionally, the processor may also store instructions and/or data. The processor and the memory may be separately disposed, or may be integrated together. For example, a correspondence described in the foregoing method embodiments may be stored in the memory or stored in the processor.

Optionally, the apparatus 1600 may further include a transceiver 1605 and/or an antenna 1606. The processor 1601 may be referred to as a processing unit, and control the apparatus 1600. The transceiver 1605 may be referred to as a transceiver unit, a transceiver machine, a transceiver circuit, a transceiver apparatus, a transceiver module, or the like, and is configured to implement a transceiver function.

Optionally, the apparatus 1600 in this embodiment of this application may be configured to perform the methods described in the embodiments corresponding to FIG. 4 to FIG. 14(1) and FIG. 14(2) in embodiments of this application, or may be configured to perform a method in which the methods described in the foregoing two or more figures are combined.

The processor and the transceiver in this application may be implemented in an integrated circuit (IC), an analog IC, a radio frequency integrated circuit RFIC, a mixed signal IC, an application-specific integrated circuit (ASIC), a printed circuit board (PCB), an electronic device, or the like. The processor and the transceiver may be manufactured by using various IC processing technologies, for example, a complementary metal oxide semiconductor (CMOS), an n-type metal oxide semiconductor (nMetal-oxide-semiconductor, NMOS), a p-type metal oxide semiconductor (positive channel metal oxide semiconductor, PMOS), a bipolar junction transistor (BJT), a bipolar CMOS (BiCMOS), silicon germanium (SiGe), and gallium arsenide (GaAs).

The apparatus described in the foregoing embodiments may be the network device or the terminal device. However, a range of the apparatus described in this application is not limited thereto, and a structure of the apparatus may not be limited to FIG. 16. The apparatus may be an independent device, or may be a part of a larger device. For example, the apparatus may be:

(1) an independent integrated circuit IC, a chip, or a chip system or subsystem;
(2) a set of one or more ICs, where optionally, the IC set may also include a storage component configured to store data and/or instructions;
(3) an ASIC, for example, a modem (MSM);
(4) a module that can be embedded in another device;
(5) a receiver machine, a terminal, an intelligent terminal, a cellular phone, a wireless device, a handheld device, a mobile unit, a vehicle-mounted device, a network device, a cloud device, an artificial intelligence device, a machine device, a home device, a medical device, an industrial device, or the like;
(6) another device, or the like.

Figure 17:
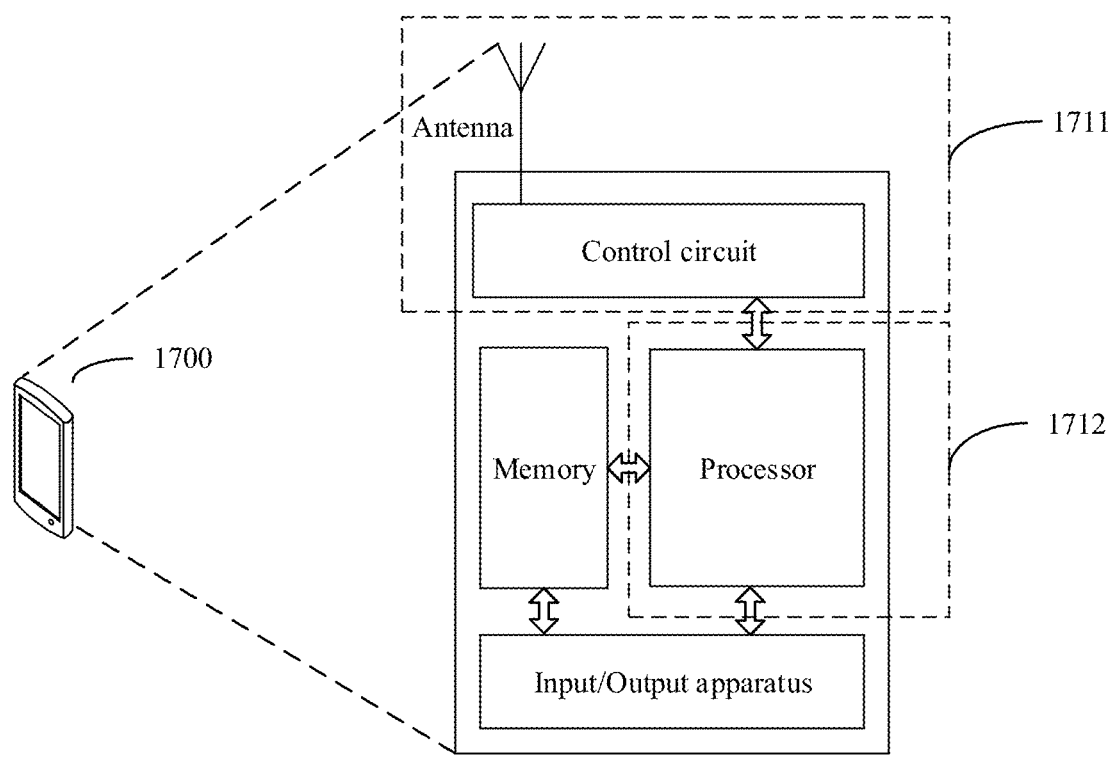
FIG. 17 is a schematic diagram of an apparatus 1700 according to an embodiment of this application.

FIG. 17 is a schematic diagram of a structure of a terminal device. The terminal device is applicable to the scenario shown in FIG. 1. For ease of description, FIG. 17 shows only main components of the terminal device. As shown in FIG. 17, the terminal device 1700 includes a processor, a memory, a control circuit, an antenna, and an input/output apparatus. The processor is mainly configured to process a communication protocol and communication data, control the entire terminal, execute a software program, and process data of the software program. The memory is configured to store the software program and the data. A radio frequency circuit is mainly configured to perform conversion between a baseband signal and a radio frequency signal, and process the radio frequency signal. The antenna is mainly configured to send and receive the radio frequency signal in a form of an electromagnetic wave. The input/output apparatus, for example, a touchscreen, a display, or a keyboard, is mainly configured to: receive data entered by a user and output data to the user.

After the terminal device is powered on, the processor may read the software program in a storage unit, parse and execute instructions of the software program, and process the data of the software program. When data needs to be sent in a wireless manner, the processor performs baseband processing on to-be-sent data, and outputs the baseband signal to the radio frequency circuit. The radio frequency circuit processes the baseband signal to obtain the radio frequency signal, and sends the radio frequency signal to the outside in an electromagnetic wave form through the antenna. When data is sent to the terminal device, the radio frequency circuit receives the radio frequency signal through the antenna, further converts the radio frequency signal into the baseband signal, and outputs the baseband signal to the processor. The processor converts the baseband signal into data, and processes the data.

For ease of description, FIG. 17 shows only one memory and one processor. In an actual terminal device, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data. The central processing unit is mainly configured to control the entire terminal device, execute the software program, and process the data of the software program. The processor in FIG. 17 integrates functions of the baseband processor and the central processing unit. A person skilled in the art may understand that the baseband processor and the central processing unit may alternatively be processors independent of each other, and are interconnected by using a technology such as a bus. A person skilled in the art can understand that the terminal device may include the plurality of the baseband processors to adapt to different network standard$_5$, the terminal device may include the plurality of the central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of software program. The processor executes the software program to implement a baseband processing function.

In an example, the antenna and the control circuit that have sending and receiving functions may be considered as a transceiver unit 1711 of the terminal device 1700, and the processor having a processing function may be considered as a processing unit 1712 of the terminal device 1700. As shown in FIG. 17, the terminal device 1700 includes the transceiver unit 1711 and the processing unit 1712. The transceiver unit may also be referred to as a transceiver, a transceiver machine, a transceiver apparatus, or the like. Optionally, a component that is in the transceiver unit 1711 and that is configured to implement the receiving function may be considered as a receiving unit, and a component that is in the transceiver unit 1711 and that is configured to implement the sending function may be considered as a sending unit. That is, the transceiver unit 1711 includes the receiving unit and the sending unit. For example, the receiving unit may also be referred to as a receiver machine, a receiver, or a receiver circuit, and the sending unit may be referred to as a transmitter machine, a transmitter, or a transmitter circuit. Optionally, the receiving unit and the sending unit may be one integrated unit, or may be the plurality of independent units. The receiving unit and the sending unit may be in one geographical location, or may be distributed in the plurality of geographical locations.

Figure 18:
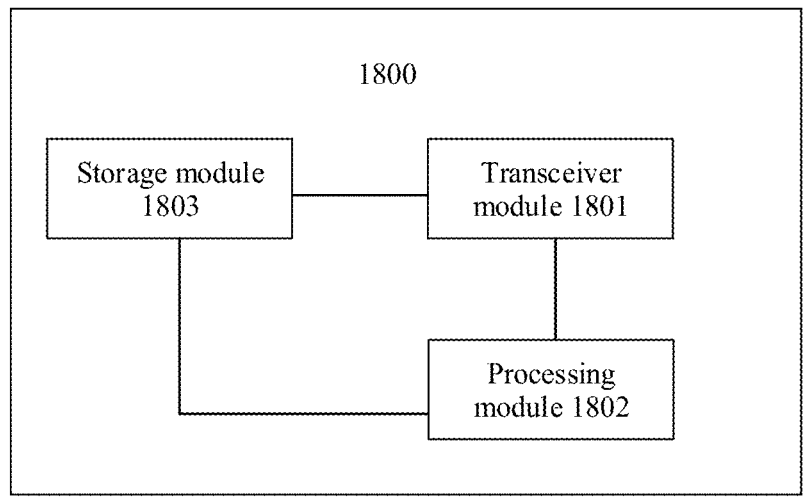
FIG. 18 is a schematic diagram of an apparatus 1800 according to an embodiment of this application.

As shown in FIG. 18, another embodiment of this application provides an apparatus 1800. The apparatus may be a terminal, or may be a component (for example, an integrated circuit or a chip) of the terminal. Alternatively, the apparatus may be a network device, or may be a component (for example, an integrated circuit or a chip) of the network device. Alternatively, the apparatus may be another communication module configured to implement the method in the method embodiments of this application. The apparatus 1800 may include a processing module 1802 (or referred to as a processing unit). Optionally, the apparatus 1800 may further include a transceiver module 1801 (or referred to as a transceiver unit) and a storage module 1803 (or referred to as a storage unit).

In a possible design, one or more modules in FIG. 18 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be disposed separately, or may be integrated together.

The apparatus has a function of implementing the terminal described in this embodiment of this application. For example, the apparatus includes a corresponding module, unit, or means used for the terminal to perform the steps related to the terminal that are described in this embodiment of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments. Alternatively, the apparatus has a function of implementing the network device described in this embodiment of this application. For example, the apparatus includes a corresponding module, unit, or means used for the network device to perform the steps related to the network device that are described in this embodiment of this application. The function, the unit, or the means may be implemented by software or hardware, or may be implemented by hardware executing corresponding software, or may be implemented by a combination of software and hardware. For details, refer to the corresponding descriptions in the foregoing corresponding method embodiments.

Optionally, the modules in the apparatus 1800 in this embodiment of this application may be configured to perform the methods described in the embodiments corresponding to FIG. 4 to FIG. 14(1) and FIG. 14(2) in embodiments of this application, or may be configured to perform a method in which methods described in the foregoing two or more figures are combined.

In a possible design, the apparatus 1800 may include the transceiver module 1801 and the processing module 1802.

In an implementation,
the processing module 1802 is configured to obtain a reference signal, first modulation data, and second modulation data; and
the transceiver module 1801 is configured to send the reference signal on a first symbol, to send the first modulation data on a second symbol, and send the second modulation data on a third symbol, where the second symbol and the third symbol are separately adjacent to the first symbol, and the second symbol is different from the third symbol, a sum of the first modulation data and the second modulation data is 0, or the first modulation data and the second modulation data are the same.

Optionally, when the sum of the first modulation data and the second modulation data is 0, two consecutive first symbols in time domain are used to carry reference signals, and a sum of the reference signals respectively carried on the two consecutive first symbols in time domain is 0.

Optionally, when the first modulation data and the second modulation data are the same, two consecutive first symbols in time domain are used to carry reference signals, and the reference signals respectively carried on the two consecutive first symbols in time domain are the same.

Optionally, the transceiver module 1801 is further configured to send third modulation data on a fourth symbol, and send fourth modulation data on a fifth symbol, where the fourth symbol is adjacent to the second symbol in time domain, the fifth symbol is adjacent to the third symbol in time domain, and a sum of the third modulation data and the fourth modulation data is 0.

Optionally, the transceiver module 1801 is further configured to send third modulation data on a fourth symbol, and send fourth modulation data on a fifth symbol, where the fourth symbol is adjacent to the second symbol in time domain, the fifth symbol is adjacent to the third symbol in time domain, and when the first modulation data is the same as the second modulation data, the third modulation data and the fourth modulation data are the same.

Optionally, the first symbol, the second symbol, and the third symbol are included in a resource unit RU, a quantity of symbols included in the RU is related to a quantity of repetitions of data on the RU, and the data on the RU includes the first modulation data and the second modulation data.

Optionally, the reference signal on the first symbol is used to demodulate the first modulation data and the second modulation data.

Optionally, the reference signal on the first symbol, the first modulation data, and the second modulation data are sent after filtering processing is performed.

In another implementation,
the transceiver module 1801 is configured to receive the reference signal on the first symbol, receive the first modulation data on the second symbol, and receive the second modulation data on the third symbol; and
the processing module 1802 is configured to demodulate the first modulation data and the second modulation data based on the reference signal.

The second symbol and the third symbol are separately adjacent to the first symbol in time domain, the second symbol is different from the third symbol, and the sum of the first modulation data and the second modulation data is 0, or the first modulation data and the second modulation data are the same.

Optionally, when the sum of the first modulation data and the second modulation data is 0, two consecutive first symbols in time domain are used to carry reference signals, and a sum of the reference signals respectively carried on the two consecutive first symbols in time domain is 0.

Optionally, when the first modulation data and the second modulation data are the same, two consecutive first symbols in time domain are used to carry reference signals, and the reference signals respectively carried on the two consecutive first symbols in time domain are the same.

Optionally, the transceiver module 1801 is further configured to receive the third modulation data on the fourth symbol, and receive the fourth modulation data on the fifth symbol, where the fourth symbol is adjacent to the second symbol in time domain, the fifth symbol is adjacent to the third symbol in time domain, and a sum of the third modulation data and the fourth modulation data is 0.

Optionally, the transceiver module 1801 is further configured to receive the third modulation data on the fourth symbol, and receive the fourth modulation data on the fifth symbol, where the fourth symbol is adjacent to the second symbol in time domain, and the third modulation data and the fourth modulation data are the same.

Optionally, the first symbol, the second symbol, and the third symbol are included in the resource unit RU, the quantity of symbols included in the RU is related to a quantity of repetitions of data on the RU, and the data on the RU includes the first modulation data and the second modulation data.

Optionally, the reference signal on the first symbol, the first modulation data, and the second modulation data are obtained after filtering processing is performed.

It may be understood that, in some scenarios, some optional features in embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the apparatus provided in embodiments of this application may also correspondingly implement these features or functions. Details are not described herein.

A person skilled in the art may further understand that various illustrative logical blocks and steps that are listed in embodiments of this application may be implemented by electronic hardware, computer software, or a combination thereof. Whether the functions are implemented by hardware or software depends on a particular application and a design requirement of the entire system. A person skilled in the art may use various methods to implement the functions for corresponding applications, but it should not be understood that the implementation goes beyond the protection scope of embodiments of this application.

It may be understood that the processor in embodiments of this application may be an integrated circuit chip, and has a signal processing capability. In an implementation process, the steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component.

The solutions described in this application may be implemented in various manners. For example, these technologies may be implemented by using hardware, software, or a combination of hardware and software. For hardware implementation, a processing unit configured to perform these technologies at a communication apparatus (for example, a base station, a terminal, a network entity, or a chip) may be implemented in one or more general-purpose processors, a DSP, a digital signal processing device, an ASIC, a programmable logic device, an FPGA, or another programmable logical apparatus, a discrete gate or transistor logic, a discrete hardware component, or any combination thereof. The general-purpose processor may be a microprocessor. Optionally, the general-purpose processor may alternatively be any conventional processor, controller, microcontroller, or state machine. The processor may also be implemented by a combination of computing apparatuses, such as a digital signal processor and the microprocessor, a plurality of microprocessors, one or more microprocessors with a digital signal processor core, or any other similar configuration.

It may be understood that, in embodiments of this application, the memory may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) that is used as an external buffer. Through examples but not limitative descriptions, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM). It should be noted that the memory of the systems and methods described in this specification includes but is not limited to these and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When the software is used to implement the embodiments, all or some of the embodiments may be implemented in a form of the computer program product. The computer program product includes one or more computer instructions. When the computer instructions are loaded and executed on the computer, all or some of the procedure or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (solid state disk, SSD)), or the like.

It may be understood that "an embodiment" mentioned in the entire specification means that particular features, structures, or characteristics related to the embodiment are included in at least one embodiment of this application. Therefore, embodiments in the entire specification are not necessarily same embodiments. In addition, these particular features, structures, or characteristics may be combined in one or more embodiments in any proper manner. It may be understood that sequence numbers of the foregoing processes do not mean an execution sequence in various embodiments of this application. The execution sequence of the processes should be determined based on functions and internal logic of the processes, and should not be construed as any limitation on the implementation processes of embodiments of this application.

It may be understood that, in this application, "when" and "if" mean that an apparatus performs corresponding processing in an objective situation, and are not intended to limit time, and the apparatus is not necessarily required to have a determining action during implementation, and do not mean any other limitation.

"Simultaneously" in this application may be understood as being at a same time point, may be understood as being within a time period, or may be understood as being within a same periodicity.

A person skilled in the art may understand that various reference numerals such as first and second in this application are for distinguishing only for ease of description, and are not used to limit the scope of embodiments of this application. A specific value of a number (which may also be referred to as an index), a specific value of a quantity, and a location in this application are merely used as an example, and are not a unique representation form, and are not used to limit the scope of embodiments of this application. Various reference numerals such as the first and the second in this application are also for distinguishing only for ease of description, and are not used to limit the scope of embodiments of this application.

In this application, unless otherwise specified, an element represented in a singular form is intended to represent "one or more", but is not intended to represent "one and only one". In this application, unless otherwise specified, "at least one" is intended to represent "one or more", and "a plurality of" is intended to represent "two or more".

In addition, the terms "system" and "network" are usually used interchangeably in this specification. The term "and/or" in this specification describes only an association relationship for describing associated objects and represents that three relationships may exist. For example, A and/or B may represent the following three cases: only A exists, both A and B exist, and only B exists. A may be singular or plural, and B may be singular or plural. The character "/" generally represents an "or" relationship between the associated objects.

The term "at least one of" in this specification indicates all or any combination of listed items. For example, "at least one of A, B, and C" may indicate the following six cases: Only A exists, only B exists, only C exists, both A and B exist, both B and C exist, and A, B, and C all exist. A may be singular or plural, B may be singular or plural, and C may be singular or plural.

It may be understood that, in embodiments of this application, "B corresponding to A" indicates that B is associated with A, and B may be determined based on A. However, it should be further understood that determining B based on A does not mean that B is determined based only on A. B may alternatively be determined based on A and/or other information.

The correspondences shown in the tables in this application may be configured, or may be predefined. Values of the information in the tables are merely examples, and other values may be configured. This is not limited in this application. When a correspondence between information and each parameter is configured, not all correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

A person of ordinary skill in the art may be aware that, in combination with the examples described in embodiments disclosed in this specification, units and algorithm steps may be implemented by electronic hardware or a combination of computer software and the electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

A person of ordinary skill in the art may understand that, for a purpose of convenient and brief description, for a detailed working process of the foregoing system, apparatus and units, refer to a corresponding process in the foregoing method embodiments. Details are not described herein again.

It may be understood that the system, apparatus, and method described in this application may also be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electronic, mechanical, or other similar forms.

The units described as separate parts may or may not be physically separate, and parts displayed as units may or may not be physical units, to be specific, may be located in one position, or may be distributed on a plurality of network units. Some or all of the units may be selected based on actual requirements to achieve the objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

For same or similar parts in embodiments of this application, refer to each other. In embodiments of this application and the implementations/implementation methods in the embodiments, unless otherwise specified or a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method according to an internal logical relationship thereof. The foregoing descriptions are implementations of this application, but are not intended to limit the protection scope of this application.

The foregoing descriptions are merely specific implementations in this application, but the protection scope of this application is not limited thereto. Any variation or replacement readily figured out by a person skilled in the art within the technical scope disclosed in this application shall fall within the protection scope of this application.

What is claimed is:

1. A signal sending method, applied to a terminal device, the method comprising:
    sending a reference signal on a first symbol;
    sending first modulation data on a second symbol, and sending second modulation data on a third symbol,
    wherein the second symbol and the third symbol are separately adjacent to the first symbol in time domain, the second symbol is different from the third symbol, and a sum of the first modulation data and the second modulation data is 0, or the first modulation data and the second modulation data are the same; and
    wherein in response to the sum of the first modulation data and the second modulation data being 0, two consecutive first symbols in time domain are used to carry reference signals, and a sum of the reference signals respectively carried on the two consecutive first symbols in time domain is 0.

2. The method according to claim 1, wherein
    in response to the first modulation data and the second modulation data being the same, two consecutive first symbols in time domain are used to carry reference signals, and the reference signals respectively carried on the two consecutive first symbols in time domain are the same.

3. The method according to claim 2, further comprising:
    sending third modulation data on a fourth symbol, and sending fourth modulation data on a fifth symbol, wherein the fourth symbol is adjacent to the second symbol in time domain, the fifth symbol is adjacent to the third symbol in time domain, and the third modulation data and the fourth modulation data are the same.

4. The method according to claim 1, further comprising:
    sending third modulation data on a fourth symbol, and sending fourth modulation data on a fifth symbol, wherein the fourth symbol is adjacent to the second symbol in time domain, the fifth symbol is adjacent to the third symbol in time domain, and a sum of the third modulation data and the fourth modulation data is 0.

5. The method according to claim 1, wherein the first symbol, the second symbol, and the third symbol are comprised in a resource unit (RU), a quantity of symbols comprised in the RU is related to a quantity of repetitions of data on the RU, and the data on the RU comprises the first modulation data and the second modulation data.

6. The method according to claim 1, wherein the reference signal on the first symbol is used to demodulate the first modulation data and the second modulation data.

7. The method according to claim 1, wherein the reference signal on the first symbol, the first modulation data, and the second modulation data are sent after filtering processing is performed.

8. A communication apparatus comprises:
a processor; and
a memory coupled to the processor and having processor-readable instructions stored thereon, which are executed by the processor and cause the communication apparatus to implement a signal receiving method including:
receiving a reference signal on a first symbol;
receiving first modulation data on a second symbol, and receiving second modulation data on a third symbol, wherein
the second symbol and the third symbol are separately adjacent to the first symbol in time domain, the second symbol is different from the third symbol, and a sum of the first modulation data and the second modulation data is 0, or the first modulation data and the second modulation data are the same; and
wherein in response to the sum of the first modulation data and the second modulation data being 0, two consecutive first symbols in time domain are used to carry reference signals, and a sum of the reference signals respectively carried on the two consecutive first symbols in time domain is 0.

9. The communication apparatus according to claim 8, wherein
in response to the first modulation data and the second modulation data being the same, two consecutive first symbols in time domain are used to carry reference signals, and the reference signals respectively carried on the two consecutive first symbols in time domain are the same.

10. The communication apparatus according to claim 9, wherein the signal receiving method further comprises:
receiving third modulation data on a fourth symbol, and receiving fourth modulation data on a fifth symbol, wherein the fourth symbol is adjacent to the second symbol in time domain, and the third modulation data is the same as the fourth modulation data.

11. The communication apparatus according to claim 8, wherein the signal receiving method further comprises:
receiving third modulation data on a fourth symbol, and receiving fourth modulation data on a fifth symbol, wherein the fourth symbol is adjacent to the second symbol in time domain, the fifth symbol is adjacent to the third symbol in time domain, and a sum of the third modulation data and the fourth modulation data is 0.

12. The communication apparatus according to claim 8, wherein the first symbol, the second symbol, and the third symbol are comprised in a resource unit (RU), a quantity of symbols comprised in the RU is related to a quantity of repetitions of data on the RU, and the data on the RU comprises the first modulation data and the second modulation data.

13. The communication apparatus according to claim 8, wherein the signal receiving method further comprises:
demodulating the first modulation data and the second modulation data based on the reference signal on the first symbol.

14. The communication apparatus according to claim 8, wherein the reference signal on the first symbol, the first modulation data, and the second modulation data are obtained after filtering processing is performed.

15. A communication apparatus comprising:
a processor; and
a memory coupled to the processor and having processor-readable instructions stored thereon, which are executed by the processor and cause the communication apparatus to implement a signal sending method including:
sending a reference signal on a first symbol;
sending first modulation data on a second symbol, and sending second modulation data on a third symbol, wherein
the second symbol and the third symbol are separately adjacent to the first symbol in time domain, the second symbol is different from the third symbol, and a sum of the first modulation data and the second modulation data is 0, or the first modulation data and the second modulation data are the same; and
wherein in response to the sum of the first modulation data and the second modulation data being 0, two consecutive first symbols in time domain are used to carry reference signals, and a sum of the reference signals respectively carried on the two consecutive first symbols in time domain is 0.

16. The communication apparatus according to claim 15, wherein
in response to the first modulation data and the second modulation data being the same, two consecutive first symbols in time domain are used to carry reference signals, and the reference signals respectively carried on the two consecutive first symbols in time domain are the same.

17. The communication apparatus according to claim 16, wherein the signal sending method further comprises:
sending third modulation data on a fourth symbol, and sending fourth modulation data on a fifth symbol, wherein the fourth symbol is adjacent to the second symbol in time domain, the fifth symbol is adjacent to the third symbol in time domain, and the third modulation data and the fourth modulation data are the same.

18. The communication apparatus according to claim 15, wherein the signal sending method further comprises:
sending third modulation data on a fourth symbol, and sending fourth modulation data on a fifth symbol, wherein the fourth symbol is adjacent to the second symbol in time domain, the fifth symbol is adjacent to the third symbol in time domain, and a sum of the third modulation data and the fourth modulation data is 0.

19. The communication apparatus according to claim 15, wherein the first symbol, the second symbol, and the third symbol are comprised in a resource unit (RU), a quantity of symbols comprised in the RU is related to a quantity of repetitions of data on the RU, and the data on the RU comprises the first modulation data and the second modulation data.

20. The communication apparatus according to claim 15, wherein the reference signal on the first symbol is used to demodulate the first modulation data and the second modulation data.

* * * * *